(12) United States Patent
Matveev et al.

(10) Patent No.: US 10,915,816 B2
(45) Date of Patent: *Feb. 9, 2021

(54) SYSTEM AND METHOD OF EXECUTING NEURAL NETWORKS

(71) Applicant: Neuralmagic Inc., Somerville, MA (US)

(72) Inventors: Alexander Matveev, Cambridge, MA (US); Nir Shavit, Cambridge, MA (US)

(73) Assignee: NEURALMAGIC INC., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,249

(22) Filed: Sep. 18, 2020

(65) Prior Publication Data

US 2021/0004684 A1 Jan. 7, 2021

Related U.S. Application Data

(63) Continuation of application No. 16/751,962, filed on Jan. 24, 2020, now Pat. No. 10,832,133, which is a
(Continued)

(51) Int. Cl.
*G06N 3/08* (2006.01)
*G06F 12/0875* (2016.01)
*G06N 3/04* (2006.01)

(52) U.S. Cl.
CPC ............ *G06N 3/08* (2013.01); *G06F 12/0875* (2013.01); *G06N 3/04* (2013.01); *G06F 2212/452* (2013.01)

(58) Field of Classification Search
CPC ........ G06N 3/08; G06N 3/04; G06F 12/0875; G06F 2212/452
See application file for complete search history.

(56) References Cited

U.S. PATENT DOCUMENTS 5,577,166 A 11/1996 Mizuno
9,558,156 B1 1/2017 Bekas et al.
(Continued)

FOREIGN PATENT DOCUMENTS

CN 107832839 3/2018
EP 3 037 980 6/2016
(Continued)

OTHER PUBLICATIONS

Yang, Yongxin, and Timothy Hospedales. "Deep multi-task representation learning: A tensor factorisation approach." arXiv preprint arXiv:1605.06391 (2016). (Year: 2016).*
(Continued)

*Primary Examiner* — Eric Nilsson
(74) *Attorney, Agent, or Firm* — Pearl Cohen Zedek Latzer Baratz LLP

(57) ABSTRACT

A system and method of inferring a neural network (NN) on one or more target computing devices. The NN may include a plurality of layers, where at least one layer includes one or more kernels. Embodiments may include: receiving a data structure representing the NN; analyzing the data structure to produce one or more tasks, where each task may include computations pertaining to a kernel of the NN; selecting a sparse version of at least one kernel and replacing the at least one kernel with the sparse version; and compiling the one or more tasks to produce one or more respective tensor columns, The one or more tensor columns are adapted to fit in respective one or more cache memories of the one or more target computing devices, and include task instruction code that represents at least one computation of the kernel of the NN.

20 Claims, 8 Drawing Sheets

Related U.S. Application Data continuation of application No. PCT/US2019/063832, filed on Nov. 29, 2019, and a continuation-in-part of application No. 16/426,609, filed on May 30, 2019.

(60) Provisional application No. 62/907,102, filed on Sep. 27, 2019, provisional application No. 62/678,757, filed on May 31, 2018.

(56) References Cited

U.S. PATENT DOCUMENTS

| | | |
|---|---|---|
| 9,811,775 B2 | 11/2017 | Krizhevsky et al. |
| 9,818,059 B1 | 11/2017 | Woo et al. |
| 10,157,045 B2 | 12/2018 | Venkataramani et al. |
| 10,223,333 B2 | 3/2019 | Chetlur et al. |
| 10,572,568 B2 | 2/2020 | Narayanamoorthy et al. |
| 10,685,082 B2 | 6/2020 | Bekas et al. |
| 10,719,323 B2 | 7/2020 | Baum et al. |
| 2010/0076915 A1 | 3/2010 | Xu et al. |
| 2011/0119467 A1 | 5/2011 | Cadambi et al. |
| 2013/0138589 A1 | 5/2013 | Yu et al. |
| 2016/0239706 A1 | 8/2016 | Dijkman et al. |
| 2016/0328643 A1 | 11/2016 | Liu et al. |
| 2016/0358070 A1 | 12/2016 | Brothers et al. |
| 2016/0379109 A1 | 12/2016 | Chung et al. |
| 2017/0103313 A1 | 4/2017 | Ross et al. |
| 2017/0103317 A1 | 4/2017 | Young |
| 2017/0132496 A1 | 5/2017 | Shoaib et al. |
| 2017/0169567 A1 | 6/2017 | Chefd'hotel et al. |
| 2017/0193361 A1 | 7/2017 | Chilimbi et al. |
| 2017/0200094 A1 | 7/2017 | Bruestle et al. |
| 2017/0220524 A1 | 8/2017 | Herrero Abellanas et al. |
| 2017/0316311 A1 | 11/2017 | Pilly et al. |
| 2017/0316312 A1 | 11/2017 | Goyal et al. |
| 2017/0032487 A1 | 12/2017 | Ashari et al. |
| 2017/0372202 A1 | 12/2017 | Ginsburg et al. |
| 2018/0046900 A1 | 2/2018 | Dally et al. |
| 2018/0096226 A1 | 4/2018 | Aliabadi et al. |
| 2018/0173571 A1 | 6/2018 | Huang et al. |
| 2018/0253402 A1 | 9/2018 | Redfern et al. |
| 2018/0315159 A1 | 11/2018 | Ould-Ahmed-Vall et al. |
| 2018/0322390 A1 | 11/2018 | Das et al. |
| 2018/0336468 A1 | 11/2018 | Kadav et al. |
| 2019/0042250 A1 | 2/2019 | Anders et al. |
| 2019/0056916 A1 | 2/2019 | Varma et al. |
| 2019/0138902 A1 | 5/2019 | Matveev et al. |
| 2019/0156206 A1 | 5/2019 | Graham et al. |
| 2019/0156214 A1 | 5/2019 | Matveev et al. |
| 2019/0156215 A1 | 5/2019 | Matveev et al. |
| 2019/0370071 A1 | 5/2019 | Mateev et al. |
| 2019/0179818 A1 | 6/2019 | Lee |
| 2019/0212982 A1 | 7/2019 | Yoda et al. |
| 2019/0303743 A1 | 10/2019 | Venkataramani et al. |
| 2019/0354894 A1 | 11/2019 | Lazovich et al. |
| 2019/0370644 A1 | 12/2019 | Kenney et al. |
| 2020/0034710 A1 | 1/2020 | Sidhu et al. |
| 2020/0097826 A1 | 3/2020 | Du et al. |
| 2020/0104717 A1 | 4/2020 | Alistarh |
| 2020/0160181 A1 | 5/2020 | Zlateski et al. |
| 2020/0160182 A1 | 5/2020 | Matveev et al. |
| 2020/0193274 A1 | 6/2020 | Darvish Rouhani et al. |
| 2020/0218978 A1 | 7/2020 | Kopinsky |
| 2020/0342301 A1 | 10/2020 | Miao et al. |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Liu, Baoyuan, et al. "Sparse convolutional neural networks." Proceedings of the IEEE conference on computer vision and pattern recognition. 2015. (Year: 2015).*

Smith, Shaden, et al. "SPLATT: Efficient and parallel sparse tensor-matrix multiplication." 2015 IEEE International Parallel and Distributed Processing Symposium. IEEE, 2015. (Year: 2015).*

Yu, Dong, Li Deng, and Frank Seide. "The deep tensor neural network with applications to large vocabulary speech recognition." IEEE Transactions on Audio, Speech, and Language Processing 21.2 (2012): 388-396. (Year: 2012).*

Kurtz, Mark, et al. "Inducing and Exploiting Activation Sparsity for Fast Neural Network Inference." Proceedings of the International Conference on Machine Learning. Jul. 2020.

Deshpande, A beginner's guide to understanding convolutional neural networks, Jul. 20, 2016.

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy of High-Performance Deep Learning Convolutions on SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17,Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.

Papyan et al., "Convolutional neural networks analyzed via convolutional sparse coding." In: The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015, (Year: 2015).

(56) References Cited

OTHER PUBLICATIONS

Wozniak et al., "GiMMiK-Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019.

Robert Lim; "Methods for Accelerating Machine Learning in High Performance Computing"; University of Oregon—Area-2019-01.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC).

Notice of Allowance from U.S. Appl. No. 16/751,953 dated Nov. 17, 2020.

\* cited by examiner

SYSTEM AND METHOD OF EXECUTING NEURAL NETWORKS

RELATED APPLICATION DATA

The present application is a continuation of prior U.S. application Ser. No. 16/751,962, filed on Jan. 24, 2020. U.S. application Ser. No. 16/751,962 is a continuation of PCT International Application No. PCT/US2019/063832, International Filing Date Nov. 29, 2019, claiming the benefit of U.S. Patent Application No. 62/907,102, filed Sep. 27, 2019. U.S. application Ser. No. 16/751,962 also claims benefit from U.S. Patent Application No. 62/907,102. U.S. application Ser. No. 16/751,962 is also a continuation-in-part of U.S. application Ser. No. 16/426,609 filed on May 30, 2019 and entitled "SYSTEMS AND METHODS FOR IMPROVED NEURAL NETWORK EXECUTION", which in turn claims benefit from U.S. provisional patent application 62/678,757, filed on May 31, 2018. Each of the prior applications listed in this paragraph is incorporated herein by reference in its entirety.

FIELD OF THE INVENTION

The present invention relates generally to the field of parallel computing systems. More specifically, the present invention relates to system and method for executing neural networks.

BACKGROUND OF THE INVENTION

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons can be for example a real number, and the output of each neuron can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons are divided or arranged into layers, where different layers can perform different kinds of transformations on their inputs and can have different patterns of connections with other layers.

NN systems can learn to perform tasks by considering example input data, generally without being programmed with any task-specific rules, being presented with the correct output for the data, and self-correcting. During learning the NN can execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) can be a deep, feed-forward network, which includes one or more convolutional layers, fully connected layers, and/or pooling layers. CNNs are particularly useful for visual and/or speech applications. Other NNs can include for example long short-term memory (LSTM) networks.

In practice, a NN, or NN learning, can be simulated by one or more computing nodes or cores, such as generic central processing units (CPUs, e.g. as embodied in personal computers) or graphics processing units (GPUs such as provided by Nvidia Corporation), which can be connected by a data network. A collection of such connected computers can be termed a pod, and computers used with NNs can be single socket (e.g. one main processor) or multi-socket (e.g. multiple processors in one machine, sharing some memory). One or more computing nodes can model a NN using known data structures. During inference or inferring, the trained NN can for example recognize or categorize images, perform speech processing, or other tasks.

A NN can be modelled as an abstract mathematical object, such as a function. A NN can be translated physically to CPU or GPU as for example a sequence of matrix operations where entries in the matrix represent neurons (e.g. artificial neurons connected by edges or links) and matrix functions represent functions of the NN.

During learning, the NN, or the computing nodes modelling the NN, can be presented with training data. For example, in an image recognition application, a NN can learn to identify images that contain cats by analyzing example images that have been manually labeled as "cat" or "not a cat" and using the results to identify cats in other images. The NN can do this without any prior knowledge about cats, e.g., that they have fur, tails, whiskers and cat-like faces. Instead, during learning the NN automatically generates identifying characteristics from the learning material that it processes.

One method of training in a NN is data parallel learning, where (typically via a master node or core), the data or training sets are divided, and each core or node operates on the same NN, using forward and backward passes, on only a portion of the data independently, and after each forward/backward pass the nodes or cores exchange parameters (e.g. weights or gradients) with each other, or send them to the master, to come up with the right parameters for the iteration. For example, on each iteration, a master node can send one different image, or a set of images, and the same model of the NN, to each of four CPUs. Each CPU can execute a forward and backward pass over all layers of the model on its specific image, and send the resulting parameters to the master, which then creates an updated model from the parameters sent by all four CPUs. Each node or processor can at times store a different version (with different parameters) of the same NN.

Typical NNs can require that nodes of one layer depend upon output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of compute power, on the order of 10s or even 100s of Teraflops, or a large set of cores. On modern GPUs this can be done using 4000-5000 cores.

One difficulty with computing each layer at a time can include a requirement that memory size used to store intermediate layer values be driven by a width of the largest layer in the particular NN.

Other difficulties with current NNs include redundant calculations. More specifically, in some scenarios (e.g., convolutional layers of the network), the same computation can be performed for two or more nodes in a particular layer and/or in two different layers.

In both GPU and CPU architectures, the neural network's weights and inputs may be represented as tensors or matrices, and the inferring computation of the network (e.g. the inference or run-time operation) includes a sequence of multiplications of these tensors or matrices. Thus, developing fast multiplication algorithms is key to the performance of NNs. Properties of these tensors or matrices can enable faster matrix multiplication algorithms One such property is sparsity—a matrix is said to be sparse if it contains a lot of entries that are zero (0). While the input matrix of data to be processed at inference or run time (and the sparsity of the input matrix) is usually out of the network designer's control, the weights of the neural network can be made sparse using for example pruning. Among the many parameters in a neural network, a fair fraction are redundant and do not contribute much to the network's output. One may, for example, rank the neurons in the network according to how much they contribute, and then remove the low ranking neurons from the network by setting their matrix entries to 0. If the process of pruning is done properly, the resulting sparse network, the one where some of the weights are zero, can actually have the same or improved accuracy relative to the original network. The big benefit however, even when some accuracy is lost, is that the resulting network could be smaller and could have a smaller memory footprint with a proper sparse matrix representation. Computation during the matrix multiplication may be reduced if multiplying by the entries of the weight matrix that are zero is avoided.

Not computing the zero elements, when the pattern of zeros is unpredictable, may require executing—e.g. at runtime or inference—a test (e.g. if zero then . . . ) to check if an element is zero, and this "branch" is a costly operation. On a GPU the cost of such a branch is a breaking of the "swarm," the collection of cores that do exactly the same thing. If there is a branch, some cores will do one thing and others another, leading to unreasonably low utilization of the GPUs synchronous SIMD execution style. On a CPU a branch is also a costly instruction.

It can be desirable to execute NNs such that computations from multiple layers can be performed at the same time to, for example, to avoid bringing data into memory several times. It can also be desirable to execute NNs such that redundant computations are eliminated. It can also be desirable to execute NNs in a computing environment which can allow efficient execution of computations using less compute power. It can also be desirable to execute NNs in a computing environment that can allow for various memory sizes independently of the size of the networks being executed. It can also be desirable to execute NNs in a manner that allows for all of the computing power to be used in each execution cycle.

SUMMARY OF THE INVENTION

Embodiments of the invention may include a synergy of two interrelated elements or processes, which both alone, and even more so—in combination, may provide a plurality of advantages or improvements over currently available systems and methods for training, executing and/or inferring NN systems. The two processes or elements may herein be referred to as "sparsification" or "pruning"; and "tensor column processing" or "pyramid processing". As elaborated herein, improvements provided by combining of sparsification and tensor column processing may include:

Enabling a processing unit (e.g., a CPU, a GPU and the like), to execute or infer a NN such that computations from multiple layers are performed in parallel, substantially concurrently (e.g., at the same time);

Eliminating redundant computations and performing NN related computations efficiently (e.g., using less compute resources);

Executing or inferring NNs optimally, in relation to specific computing environments. The term 'optimally' may refer, in this context, to executing the NN-related computations in a manner that best fits various memory configurations and/or sizes that may be included in the specific computing environments;

Employing processing units' computing power to perform NN related computations in each execution cycle (e.g., not having to wait for an outcome of one NN layer in order to perform a computation pertaining to a subsequent layer);

Balancing load of NN related computations among a plurality of processing cores or processing units (e.g., assigning tasks to different cores of a multicore processing system based, for example, on each core's availability);

Avoiding access (e.g., read access and/or write access) to non-cache memory, so as to reduce the overall time it takes to execute the NN on the processing unit; and Reducing an overall number of computations that may be necessary to train, execute or infer the NN.

In some embodiments, the various NN processes described herein, such as inference using sparsity and inference using pyramidal or tensor column processing, may be used separately.

Embodiments of the invention may include pyramid or tensor column processing that may execute the layered graphs defining NNs (e.g., CNNs) on multicore CPUs that typically have large caches and low memory bandwidth. Pyramid or tensor column embodiments may divide computations (e.g., training of the NN and/or executing or inferring the NN) into tasks in a manner that can be agnostic to the layered structure of the network. The NN may thus be broken down into asynchronously executable "pyramid"-shaped or "tensor column"-related tasks that can cross layer boundaries.

According to some embodiments of the invention, one or more (e.g., each) task can be executed by a single compute core, encompassing a part of the computation (e.g., the NN inference) that can optimize the cache and/or compute capabilities of this individual core. One benefit of this approach can be to reduce the amount of data brought to memory at any given time so that it can be proportional to (e.g., fully reside in) the total amount of core cache memory and may be agnostic to a size of any given network layer. Another benefit of this approach can be that it can also turn computations that are memory bound into ones that are compute bound for the most complex convolutional transforms and computations. This can speed up the execution of NNs (e.g., CNNs, DNNs) on processing units (e.g., CPUs) considerably because, for example, it can (a) allow the processing units to use their limited memory bandwidth resource more efficiently, and (b) perform the NN related computations as parallel tasks, rather than serially, where a computation pertaining to a first layer should await the output of a computation pertaining to a second, preceding layer.

As elaborated herein, embodiments of the invention may execute a CNN computation graph as a collection of tensor column related (or 'pyramid') tasks, each executing a subset of the neurons or nodes across several layers, rather than just a subset of the nodes or neurons of a given layer. As elaborated herein (e.g., in relation to FIG. 3), in a CNN, the subset of network nodes can form an abstract shape of a pyramid; hence the name. The choice of neurons executed in each pyramid or tensor-column related task can be designed to (1) fit the computation of the task, e.g. perfectly, into the cache memory (e.g., element 9 of FIG. 1) of a computing core executing it, and thus minimize the number of times data must be moved from the cache 9 into and out of an external memory (e.g., element 4 of FIG. 1, external to processor 2 there), (2) maximize the utilization of computing cores by load balancing them across the depth of the computation graph rather than across a given layer, and (3) reduce the amount of data that needs to be brought to memory at the same time from being proportional to the size of a layer to being proportional to the size of the sum total of the processors' cache sizes.

According to some embodiments, in a tensor column or pyramid implementation, a first set of tasks may output to a second set of tasks which may output to a third set of tasks, etc. For each output, an algorithm may recursively move back in the layers, aggregating the sub-computations necessary to compute this single output. Determining which input is required for an ultimate output may be repeatedly applied backwards through a reshuffle (e.g. taking data and either storing it in a different order or designing code that accesses the data in a different order, a virtual reshuffle) and a matrix multiply and stop in a matrix multiply as the total memory capacity is reached. Next, all the computations needed to create the inputs to a certain task (which are the outputs of other tasks) may be aggregated into a new set of tensor column related, or 'pyramid' tasks that may be calculated backwards to include for example re-shuffle, pooling, and the layers of a convolutional computation (e.g., a Winograd transformed convolutional computation, without the Winograd initial transform, because the tasks maximal total cache memory is already met). After, in turn, each of the inputs to a task may be computed via a new set of tensor column or pyramidal tasks that may span the convolutional computation (e.g., direct convolution layers, the forward Winograd transform convolutional computation, etc.), pooling layers and the like.

The terms 'pruning' and 'sparsification' may be used herein interchangeably to refer to a process of reducing a number of elements that may be included in a NN-related computation. For example, in some embodiments, one or more kernels of convolutional layers may be pruned or made sparse, to nullify one or more weight values included therein.

As explained above, embodiments of the present invention may include combining the tensor column or pyramid technique with a process of pruning or sparsification. This combination may allow the memory space required for NN computations pertaining to a task to completely reside within a cache memory of a respective processing unit. Thus, the task's computations may be completely executed in the cache as a sub-task of the NN computations. (e.g., inference and/or training).

For example, as known in the art, previously available systems for executing NN-related computations may involve convolutional layers that may include one or more kernels that may in turn include a plurality of weight values. In order to obtain efficient computation, the kernels that contain the weights in the network should fit completely in memory (e.g., a cache memory) during execution (e.g. inference). Moreover, the related output should be computed and should reside in memory before a subsequent layer (e.g., an ReLU layer) is executed. This requirement may be problematic since the kernels and/or output of intermediary computations of the convolutional layer may be too large to fit into the cache of the multicore core that is executing it. Moreover, in some implementations, the kernels must be brought in completely and reside in memory together before the subsequent (e.g., ReLU) computation is performed. Hence, there may be no obvious way to break computations down into sub-computations (e.g., tasks) as desired in a 'pyramid' or tensor column method, as elaborated herein. This can cause performance deterioration. One technique for overcoming this limitation is to sparsify or prune elements of the network, so as to remove certain entities such as weights or values that may be included in one or more kernels. This pruning may decrease the number of weights one needs to bring into cache for every computation, and may allow the kernels and/or output of intermediate convolutional layer computations to fully fit in the cache. Thus, the task may be computed through multiple layers of the network without having to write or read values to memory.

It may be appreciated by a person skilled in the art that the pruning or sparsification of kernels should be performed so as to avoid substantial decrease of NN-related computation accuracy or precision. The term 'substantial' may refer in the context of NN output precision to a change in the NN output that may exceed a predefined threshold or percentage, and may be specifically set or determined in relation to each specific NN or application.

It may be appreciated by a person skilled in the art that mere pruning of elements (such as convolutional weights within one or more kernels) may not be sufficient to fully exploit the benefits data reduction: as known in the art, storage and/or retrieval of a sparse or pruned data element may consume memory space and/or bandwidth that may be equivalent to a non-sparse data element of an equivalent size. Moreover, handling of a sparse data element may consume expensive 'fork' computational cycles (e.g., "perform a first action if content is zero, and perform another action if content is non-zero"). Hence, embodiments of the invention may include, at a stage prior to inference of the NN, a stage of compilation or preparation of code instructions that may pertain to the NN. The code instructions may be kept ready to facilitate rapid inference of the NN on incoming (e.g., real-time) data, as elaborated herein.

In other words, intelligent pruning or sparsification of data pertaining to NN computations (e.g., pruning of convolution kernels or weights) may allow parts of the computation that did not initially fit in a cache of a computing device (e.g., due to size of the kernels) to now fit in the cache, and may enable embodiments of the invention to: (a) turn the NN-related computation from being memory bound (e.g., limited by a memory bandwidth) to being compute bound (e.g., limited by computing power of the processing unit); (b) facilitate the advantages of pyramid or tensor column implementations, as elaborated herein; (c) avoid a change in NN output that is beyond a predefined precision threshold; and (d) at an inference or execution stage, rapidly infer the NN on incoming data (e.g., real-time images of a video stream) by applying precompiled instruction code on the incoming data.

For example, as known in the art, NNs such as CNNs or other deep NNs (DNNs) may include several layers such as convolutional layers and/or fully connected layers, followed by ReLUs, pooling and/or other non-linear functions. Intelligent pruning of kernels of the convolutional layers may maintain a required level of computational precision, and may enable processing units to compute output of tasks (e.g., output pyramids or tensor columns) from within the processing units' cache memory space. This may imply a great reduction in the overall access to memory over the execution of the layers, and may deliver acceleration in NN-related computation (e.g., NN inference and/or training).

In another example, in a neural network where one is computing a convolution followed by a ReLU several times in a row, the kernels might be too big to fit in cache. But a sparsification of the kernels by 80% would reduce their size by a factor of 5, and now they could fit in the cache, allowing the execution of sub-tasks that span multiple consecutive layers of cony and ReLU. This would imply a great reduction in the overall access to memory over the execution of the layers, and deliver acceleration.

One embodiment may perform operations such as the following. In the example provided, computation takes place using a CNN with 6 layers: conv1, relu1, conv2, relu2, conv3, relu3. Other NNs may be used:

a. Assume that conv1 and similarly conv2 weights are all non-zero and they take 5 MB. The L2 cache of a typical Intel CPU core is 1 MB (other processors and cache sizes may be used), so the conv1 weights (and similarly cony 2 weights) will not all fit in the cache.
  b. One can create a subtask that runs through all of the 6 layers: it computes a subset of conv1 output, does ReLU on this subset, then computes conv2 on this subset, does relu2 and so on. For this subtask to proceed from conv1-relu1 to conv2-relu2 and then to conv3-relu3, all of the output channels of conv1 should be computed (else relu2 cannot be applied). This means that the weights of conv1 and conv2 should be in the L2 cache. As noted however, they are too large, and so the subtask will spill out of cache and will not deliver performance.
  c. One can prune the convolutional layers by 90%, which will result in a reduced matrix with 0.5 MB non-zero weights per convolutional layer (conv1 and conv2), so that the pruned weights can fit into the L2 cache.

The sparsity thus allows the computation to proceed through the layers completely in cache, avoiding the overhead of reading and writing from memory in the interim between layers.

On the flip side, if there were not for the 90% sparsity, then the conv1, conv2, conv3 computations could be compute-bound, so there might be no need to break down to subtasks that go through multiple layers to utilize the CPU flops. Thus, sparsity serves the pyramid or tensor column task by reducing the size of the weights so they can be brought fully into cache for the subtask, and on the other hand, the breakdown to subtasks that go through multiple layers, allows the new sparse computation that might require 90% less compute and become memory bound, to be more compute-bound because it runs completely in cache and does not incur memory access delays.

Embodiments of the present invention may include a method of executing (e.g., inferring) a NN (e.g., a CNN, a DNN, etc., such as element NN 10 of FIG. 4) on one or more target computing devices. The NN may include a plurality of layers (e.g., a convolutional layer, a fully-connected layer, etc.) and at least one layer may include one or more kernels.

Embodiments of the method may be implemented by at least one processor or controller such as element 2 of FIG. 1. Embodiments of the method may include: receiving (e.g., by processor 2) a data structure representing the NN; receiving cache parameter values (e.g., cache memory size) pertaining to cache memory of the one or more target computing devices; analyzing the data structure to produce one or more tasks, where each task may include at least one computation that pertains to a kernel of the NN; selecting a sparse version of one or more kernels of the one or more tasks; and compiling the one or more tasks to produce one or more respective tensor columns that may include task instruction code representing the at least one computation.

The one or more tensor columns may be adapted or configured to fit in respective one or more cache memories of the one or more target computing devices, according to the received cache parameter values.

Embodiments of the present invention may include: storing the one or more tensor columns in respective cache memories of the one or more target computing devices; and inferring the NN on incoming data by executing the task instruction code on the incoming data, within the cache memory space.

According to some embodiments of the present invention, selecting a sparse version of one or more kernels may include: producing one or more sparse versions of the of one or more kernels; calculating a level of precision of an output of a task corresponding to the one or more sparse versions; and selecting a sparse version from the one or more sparse versions according to at least one of: the calculated level of precision and cache parameter values.

According to some embodiments of the present invention, at least one tensor column may include at least one task instruction code that represents at least one computation spanning a plurality of layers of the NN.

According to some embodiments of the invention, the one or more tasks may include computations pertaining to at least one kernel that may include one or more zero-value elements (e.g., a sparse kernel). Compiling the one or more tasks may include producing a task instruction code block or segment that may be devoid (e.g. has none) of zero-value kernel elements.

For example, producing a task instruction code block or segment that is devoid of zero-value kernel elements may include, during compilation of the one or more tasks, including a compressed format of at least one sparse kernel version in the task instruction code. During inference of the NN, embodiments of the invention may include decompressing the compressed format to obtain non-zero elements of the sparse kernel and performing kernel-related computations that only pertain to the non-zero kernel elements.

In another example, producing a task instruction code block or segment that is devoid of zero-value kernel elements may include, during compilation of the one or more tasks, including only non-zero elements of at least one kernel (e.g., a sparse kernel version) in the task instruction code. During inference of the NN, embodiments of the invention may include performing kernel-related computations that only pertain to the non-zero kernel elements.

According to some embodiments of the invention, analyzing the data structure may include: selecting a subset of nodes of a layer of the NN as an input vector of a task; and calculating a required memory space for output of computations of the task, according to the input vector.

Embodiments of the invention may include: maintaining the input vector of the task as part of the respective tensor column data structure; maintaining the task instruction code of the task as part of the respective tensor column data structure; and allocating the required output memory space in the respective tensor column data structure.

Embodiments of the invention may include: storing the task instruction code on an instruction cache memory of a target computing device; storing the input vector on a data cache memory of the target computing device; and allocating the required output memory space on a data cache memory of the target computing device.

Embodiments of the invention may include: (a) receiving an incoming data element; (b) obtaining a data subset of the incoming data element according to the input vector; (c) applying a computation represented by the task instruction code on the obtained data subset, the computation pertaining to a first layer of the NN; (d) storing the computation output in the allocated output memory space; and (e) repeating steps (c) and (d) with computations pertaining to subsequent layers of the NN, using the data stored in the allocated output memory space as input to the extent of the task instruction code.

According to some embodiments of the invention, the cache parameter values may include a cache memory threshold. Additionally, selecting a subset of nodes may include: determining a group of output nodes pertaining to a first layer of the plurality of layers; identifying a number of input nodes in one or more second layers that precede the first layer in the NN, the input nodes pertaining to computation of the determined group of output nodes. The number of input nodes may correspond to the largest number of computations that results in a memory requirement that may be less than the cache memory threshold.

Embodiment of the present invention may include a method of training a NN (e.g., NN 10 of FIG. 4) on one or more target computing devices. The NN may include a plurality of layers and at least one layer may include one or more kernels. Embodiment of the method may include: receiving a data structure representing the NN; receiving cache parameter values pertaining to cache memory of the one or more target computing devices; analyzing the data structure to produce one or more tasks, where each task may include at least one computation that pertains to a kernel of the NN; selecting a sparse version of one or more kernels of the one or more tasks; compiling the one or more tasks to produce one or more respective tensor columns may include task instruction code representing the at least one computation; storing the one or more tensor columns in respective cache memories of the one or more target computing devices according to the received cache parameter values; and training the NN on incoming training data by executing the task instruction code on the incoming data, within the cache memory space.

Embodiment of the present invention may include storing the one or more tensor columns in respective cache memories of the one or more target computing devices; and training the NN on incoming data by executing the task instruction code on the incoming data, within the cache memory space. For example, during a gradient update phase of a training of the NN, the output data of each computation (e.g., a content of element 30A of FIG. 5) may include an update of a value or a weight of at least one neural node of the NN.

Embodiment of the present invention may include a system for inferring a NN (e.g., element 10 of FIG. 4) on one or more target computing devices (e.g., element 60 of FIG. 4). Embodiment of the system may include: a non-transitory memory device (e.g., element 4 of FIG. 1), wherein modules of instruction code (e.g., element 5 of FIG. 1) may be stored, and a processor (e.g., element 2 of FIG. 1) associated with the memory device, and configured to execute the modules of instruction code. Upon execution of said modules of instruction code, the processor may be further configured to: receive a data structure representing the NN; receive cache parameter values pertaining to cache memory of the one or more target computing devices; analyze the data structure to produce one or more tasks, where each task may include at least one computation that pertains to a kernel of the NN; select a sparse version of at least one kernel of the one or more tasks and replacing the at least one kernel with the sparse version; and compile the one or more tasks to produce one or more respective tensor columns may include task instruction code representing the at least one computation. The one or more tensor columns may be adapted to fit in respective one or more cache memories of the one or more target computing devices, according to the received cache parameter values.

According to some embodiments, the one or more target computing devices may be configured to: store the one or more tensor columns in respective cache memories of the one or more target computing devices; and infer the NN on incoming data by executing the task instruction code on the incoming data, within the cache memory space.

According to some embodiments, the processor may be configured to select a sparse version of one or more kernels by: producing one or more sparse versions of the of one or more kernels; calculating a level of precision of an output of a task corresponding to the one or more sparse versions; and selecting a sparse version from the one or more sparse versions according to at least one of: the calculated level of precision and the cache parameter values.

According to some embodiments, the one or more target computing devices may be configured to: (a) receive an incoming data element; (b) obtain a data subset of the incoming data element; (c) apply a computation represented by the task instruction code on the obtained data subset, the computation pertaining to a first layer of the NN; (d) store the computation output in an allocated output memory space; and (e) repeat steps c and d with computations pertaining to subsequent layers of the NN, using the data stored in the allocated output memory space as input to the extent of the task instruction code.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
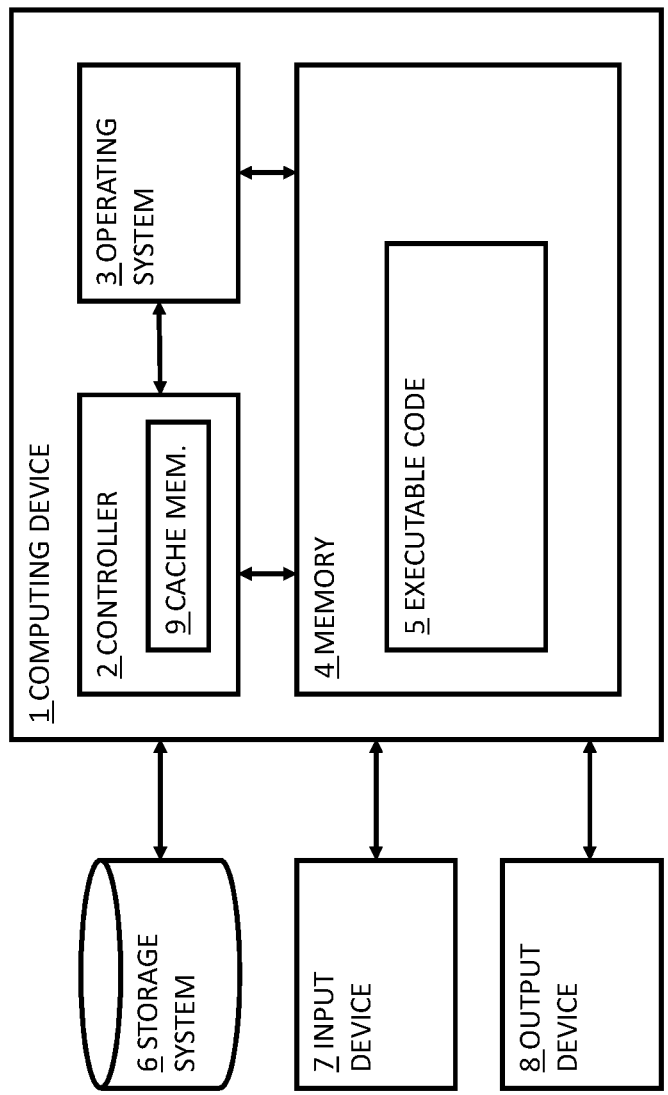
FIG. 1 is a block diagram, depicting a computing device which may be included in a system for executing neural networks, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for executing neural networks, according to some embodiments.

Computing device 1 may include a processor or controller 2 that may be, for example, a central processing unit (CPU) processor, a GPU, a chip or any suitable computing or computational device, an operating system 3, a memory 4, executable code 5, a storage system 6, input devices 7, output devices 8 and cache memory 9. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention. Embodiments of the present invention may be executed by one or more systems such as in FIG. 1; e.g. elements of FIG. 5 may include components of FIG. 1.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3. Controller 2 may be a multicore processor, e.g. a CPU or GPU, e.g. one chip including a number of cores, each capable of executing a processing thread at the same time other cores in the controller are executing another, possibly different, threat. Controller 2 may include caches: in some embodiments some caches may be local or private to a specific core, and other caches may be shared by all cores on a controller.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may calculate sparse tensor columns for neural networks as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit.

Data pertaining to sparse tensor columns may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Cache memory 9 may be or may include for example, a Layer 1 (L1) cache module, a Layer 2 (L2) cache module and/or a Layer 3 (e.g., L3) cache memory module, as known in the art. Cache memory 9 may include, for example, an instruction cache memory space and/or a data cache memory space, and may be configured to cooperate with one or more processors (such as element 2) and/or one or more processing cores to execute at least one method according to embodiments of the present invention. Cache memory 9 may typically be implemented on the same die or chip as processor 2 and may thus be characterized by a memory bandwidth that may be higher than that of memory 4 and storage system 6.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2A:
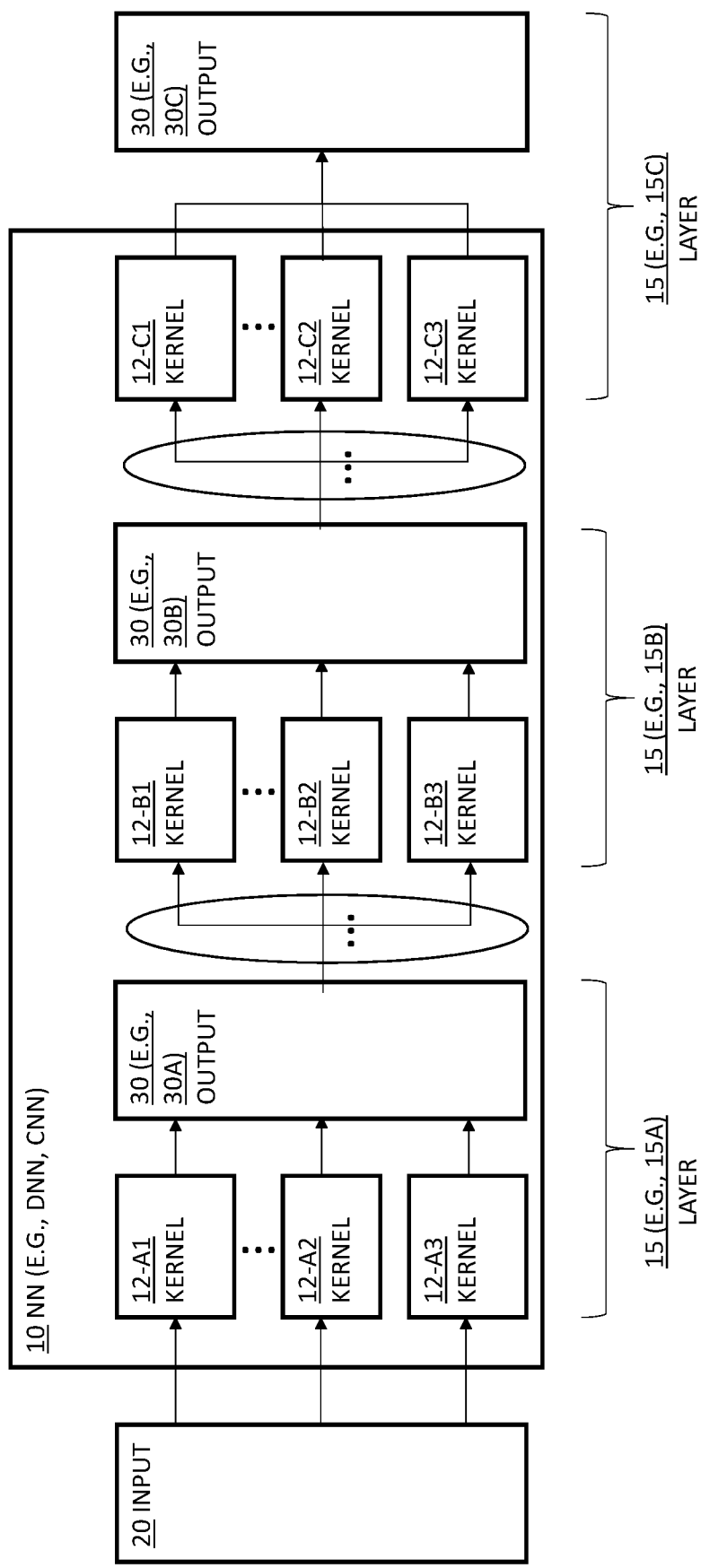
FIG. 2A is a block diagram, depicting an example of a multiple layer NN (e.g., a dense NN, a convolutional NN, and the like), as known in the art.

Reference is now made to FIG. 2A, which is a block diagram depicting a schematic example of a multiple layer NN 10 (e.g., a dense NN, a convolutional NN, and the like), as known in the art.

As shown in FIG. 2A, NN 10 (e.g., a convolutional neural network) may include a plurality of layers 15, such as convolutional layers, as known in the art. In the example of FIG. 2A, layers 15 (e.g., convolutional layers) may include one or more respective kernels 12 (e.g., marked 12-A1 through 12-C3). Executing or performing computation of each layer may include applying the respective kernels to incoming data of the convolutional layers, as known in the art.

As shown in FIG. 2A, NN 10 may include additional layers and/or logic modules, such as pooling layers, fully-connected layers 'softmax' layers, and the like. These additional layers and/or logic modules are schematically marked as gaps (e.g., ' . . . ') to avoid unnecessary clutter.

Each layer may require one or more processing cores (e.g., element 2 of FIG. 1) to compute or produce an output of the respective layer 15 when applied to or inferred on an input data (e.g., by applying a kernel 12 to incoming data). Additionally, each layer may require one or more memory locations of a memory space (e.g., element 4 of FIG. 1) that may be associated with processor 2 and may store results and/or intermediate computation results of the respective layers 15 (e.g., 15A, 15B, 15C).

In commercially available systems for executing NNs, during execution (e.g., inference of NN 10 on incoming data), a first layer (e.g., layer 15A, such as a convolutional layer) may be concurrently executed by multiple threads and/or computational nodes or computing devices. The first layer (e.g., 15A) may be executed or applied on input data 20 (e.g., from an input buffer). The result of computation may be output or written to following one or more output buffers 30 (e.g., 30A). After all of the outputs of layer 15A are written by the threads, the outputs of the layer 15A may be read from the one or more output buffers 30, as input to the subsequent layer 15 (e.g., 15B). It is to be understood that previously available systems and methods of executing NNs may require all threads and/or computing devices to complete one layer (e.g., 15A) before moving on to compute or execute the next layer (e.g., 15B).

After the first layer (e.g., 15A) is completed and its outputs are all written (e.g., in an output buffer, such as 30A), the subsequent layer, such as a pooling layer, a second convolutional layer and/or additional logic modules (e.g., marked as gaps ' . . . ') may be executed. The outputs of the subsequent layer may be written to the next output buffer (e.g., 30B), and so forth in a sequential manner, to the extent of NN 10.

Figure 2B:
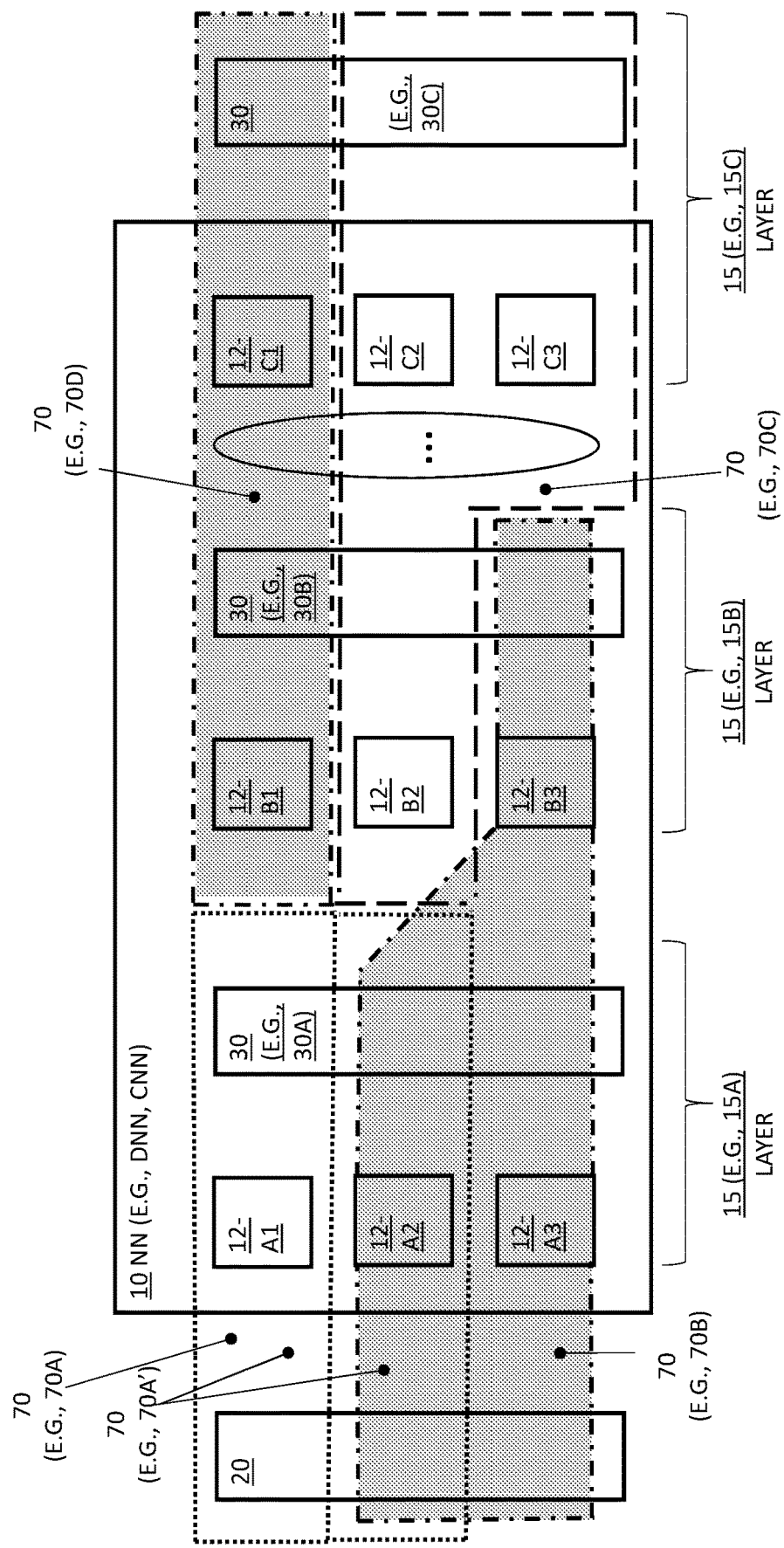
FIG. 2B is a block diagram, depicting the NN of FIG. 2A, having a plurality of sub computations (e.g., tasks), spanning more than one layer of the NN, according to some embodiments of the invention.

Reference is now made to FIG. 2B, which is a block diagram, depicting the NN of FIG. 2A, having a plurality of sub computations (e.g., tasks), spanning more than one layer of the NN, according to some embodiments of the invention.

Although the layers of FIG. 2B are the same layers as FIG. 2A, it can be seen in FIG. 2B that there are plurality of sub-computations or tasks 70 (e.g., bordered by dashed lines), that span across multiple layers 15.

During execution, tasks 70 may be executed in parallel, e.g., asynchronously, or at different times. In this manner, execution of NN 10 (e.g., the CNN) layer by layer can be avoided, and parts of a layer A receiving input from layer B be executed before all of layer B is executed.

For example, as shown in FIG. 2B, a first task 70 (e.g. 70A) may be computationally discernable or separate from a second task 70 (e.g., 70B). In other words, computation of first task 70A may require input that may be different and/or independent from the input of second task 70B. In this example, computation of task 70A may include applying kernel 12-A1 on a first subset of input 20 and applying kernels 12-A2 and 12-A3 on a second subset of input 20. Therefore, embodiments of the invention may partition NN10 to produce separate tasks 70A and 70B. Embodiments of the invention may, during execution, perform computation of tasks 70A and 70B in parallel, and in an asynchronous manner, e.g., on separate threads and/or by separate processing cores (e.g., element 2 of FIG. 1).

In another example, computation of task 70A' may partially overlap with computation of task 70B. For example, kernel 12-A2 may pertain to computation of task 70A' as well as to the computation of task 70B. Embodiments of the invention may, during execution, perform computation of tasks 70A' and 70B in parallel, and may share outcome of overlapping computations between the tasks 70A' and 70B, to avoid waste of memory space and delay due to repetition of execution of instruction code.

In another example, embodiments may partition NN to form tasks that are dependent, and may execute a first task as soon as output of a second, preceding task is ready. For example, as shown in FIG. 2B, task 70C may be executed as soon as the output of task 70B is ready.

The plurality of sub-computations or tasks 70 (e.g., 70A through 70D) can be determined prior to execution. The plurality of sub-computations can be determined recursively, moving back from a portion of an output layer of NN 10 (e.g., output 30C) and aggregating the sub-computations that are required to produce that portion of output 30C.

For example, as can be seen in FIG. 2B, task 70D traverses back and aggregates all outputs and/or computations from the output (e.g., 30C) of layer 15C, through optional additional layers and/or logic modules (marked as a gap, . . . ') and stops in layer 15B.

As elaborated herein, embodiments of the invention may partition the NN to tasks 70 so that each task may fit a memory space (e.g., a cache memory) that may pertain or be associated with (e.g. private to) a processing unit or processing core that executes the respective task. In other words, tasks 70 may be configured or calculated such that the content of expected incoming input (e.g., at a stage of inference) the content of kernels pertaining to the computation and the size of the output of computation may not exceed a predefined memory threshold. The predefined threshold may be optimally set or selected based on specific embodiments or configurations of the system. For example, a large cache memory may enable setting a high value to the predefined cache memory threshold. In another example, a high workload (e.g., a plurality of computing processes or threads) may dictate setting a low value to the predefined cache memory threshold.

Thus, computation of each task may completely reside within a cache memory (e.g., element 4 of FIG. 1) of a processing core (e.g., element 2 of FIG. 1), facilitating efficient computation of the task. As elaborated herein, embodiments may include pruning or sparsification of one or more kernels 12, to ensure that computation of tasks 70 indeed resides within the designated cache memory space.

Pertaining to the example of task 70D, the extent of computations of task 70D (e.g., tracing from a subset of output 30A as incoming input, through kernel 12-B1 of layer 15B, through kernel 12-C1 of layer 15C to a subset of output 30C) may be calculated so as to keep the required memory space equal to, or lower than the predefined cache memory threshold. This may enable processing core 2 to perform the entirety of calculations of task 70D from the cache memory space.

It may be appreciated by a person skilled in the art, that the total amount of memory required to hold output of sub computations along the trace of a task may be smaller than the sum of output spaces along that trace. Pertaining to the example of task 70D, the memory space (e.g., in output buffer 30B) required for output of computations pertaining to layer 15B (e.g., using kernel 12-B1) may be reused for a computations pertaining to a subsequent layer (e.g., 15C) along the trace of task 70D. In other words, embodiments of the invention may calculate the memory space required for a task based on the reallocation or reuse of memory space for consecutive computations in or along the tasks (e.g., along at least one task).

In a similar manner to that elaborated above (e.g., in relation to task 70D), all of the outputs and computations needed to create the inputs for each task (e.g., task 70C, which requires the outputs of 70A' and 70B) may be considered. Each of the preceding tasks (e.g., 70A' and 70B) may be traversed back, to aggregate all outputs and/or computations from previous tasks and/or from input layer 20. As in the example of task 70D, the extent of each task (e.g., 70A' 70B, 70C) may be calculated so as to keep the required memory space equal to, or lower than respective predefined cache memory thresholds.

Figure 3:
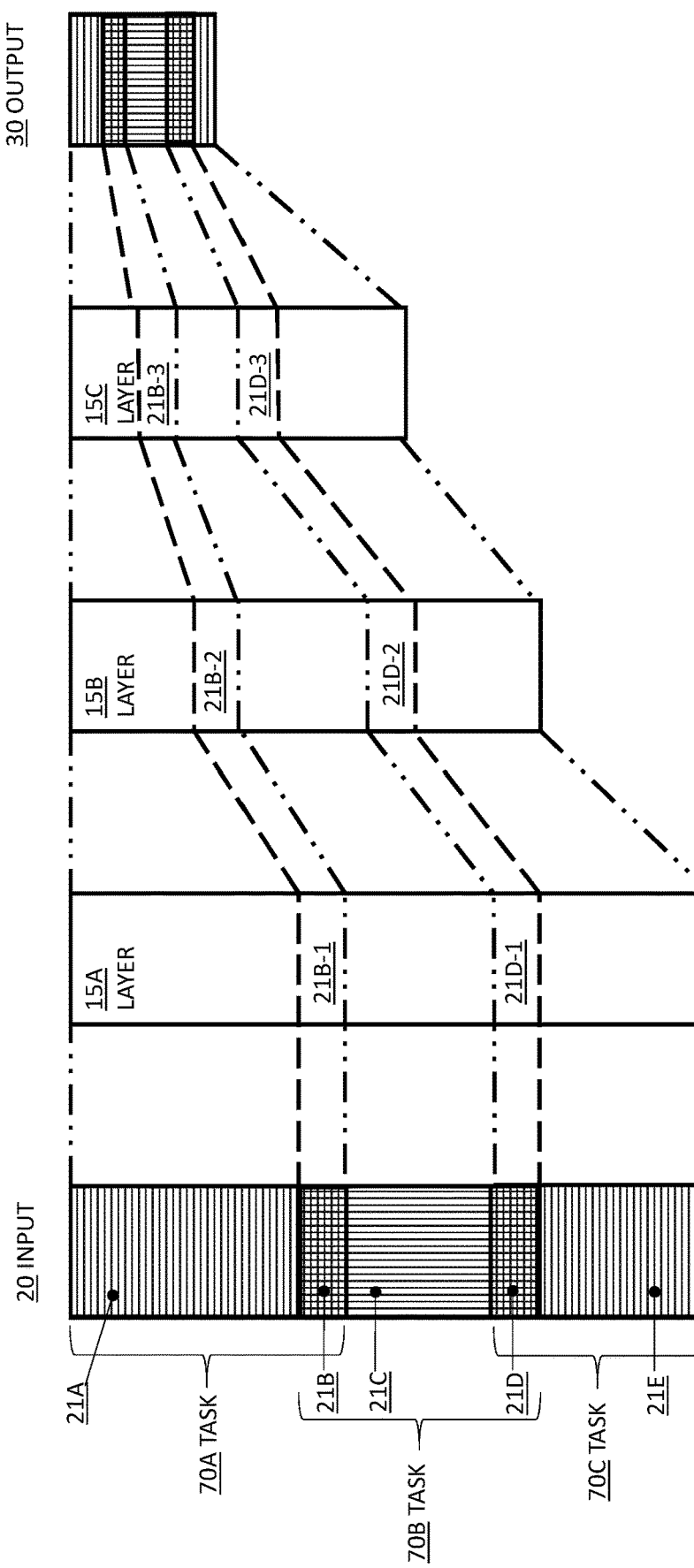
FIG. 3 is a schematic diagram, depicting an example of a NN computation including one or more tasks, that may be included in a system for executing neural networks, according to some embodiments.

Reference is now made to FIG. 3, which is a schematic diagram, depicting an example of a NN computation including one or more tasks, that may be included in a system for executing neural networks, according to some embodiments.

Embodiments of the invention may be configured to reduce the number of computations required for executing (e.g., inferring) and/or training a neural network can be reduced.

For example, tasks that include convolutional layer operations can require the same computation be performed multiple times. Reduction of computation may include avoidance of such repetition of sub-computations.

In another example, for a given layer in a NN there can be overlaps in input sets of neighbors, that is tasks that handle proximate parts of the input. For example, for a NN that processes a part of a two dimensional image, these computations can have neighboring pixels in the image. Each computation can have eight neighbors, four of the shared regions can be shared with neighbors in a pairwise manner, and four can be shared with three other neighbors. The one computation shared between a pair can repeat only once, but the one computations shared with three other neighbors can be recomputed three additional times.

As can be seen in FIG. 3, task 70A and task 70B may have overlapping regions 21B-1, 21B-2, 21B-3, in layers 15A, 15B and 15C respectively. Task 70B and task 70C may have overlapping regions 21D-1, 21D-2, 21D-3, in layers 15A, 15B and 15C respectively. Embodiments of the invention may typically include executing task each task 70 separately, e.g., on a separate processing unit (e.g., element 2 of FIG. 1) or processing core. If tasks 70A and 70C complete their computations prior to the execution of task 70B, then embodiments of the invention may use the overlap regions' results without having to recompute the values in the overlap regions.

In some embodiments of the invention, the computations that are repeated can be executed only once and the results can be stored in the cache and accessed each time the result of that particular repeated computation is needed.

Embodiments of the invention may determine (e.g., by tensor column generator 530 of FIG. 4) each repeated computation in the plurality of sub-computations. The repeated computations can be determined based on identifying one or more overlap regions (e.g., regions 21B-1-21B-3 and 21D-1-21D-3 of FIG. 3). Overlap regions can be determined statically based on the network structure by looking at the input ranges of the various input neurons to the bottom layer of a task.

As explained herein (e.g., in relation to FIG. 4), embodiments of the invention may include analyzing the data structure of NN 10 (e.g., tensor column generator 530 of FIG. 4), to identify overlapping regions among two or more tasks, and handle such overlapping regions so as to execute each repeated computation only once.

In some embodiments, executing each repeated computation only once can involve determining whether the overlap region has been executed already or not. For example, during an initial stage of compilation, embodiments of the invention (e.g., tensor column generator 530) may identify overlapping regions among two or more tasks and associate each overlapping region with an overlap 'flag' or indicator. During a later execution or inference stage, one or more target computing devices (e.g., elements 60 of FIG. 4) may store a result of each repeated computation (e.g., store overlap region computations in a buffer) and set the overlap indicator, to indicate that the outcome of the relevant computation is available at the respective buffer, to avoid recomputing calculations of the overlapping region. In other words, embodiments of the invention may include reusing (e.g., avoiding recalculation of) the result of each repeated computation for each sub-computation of the plurality of sub-computations that has not yet been executed and has a computation that is the same as any of the repeated computations with stored results.

Figure 6:
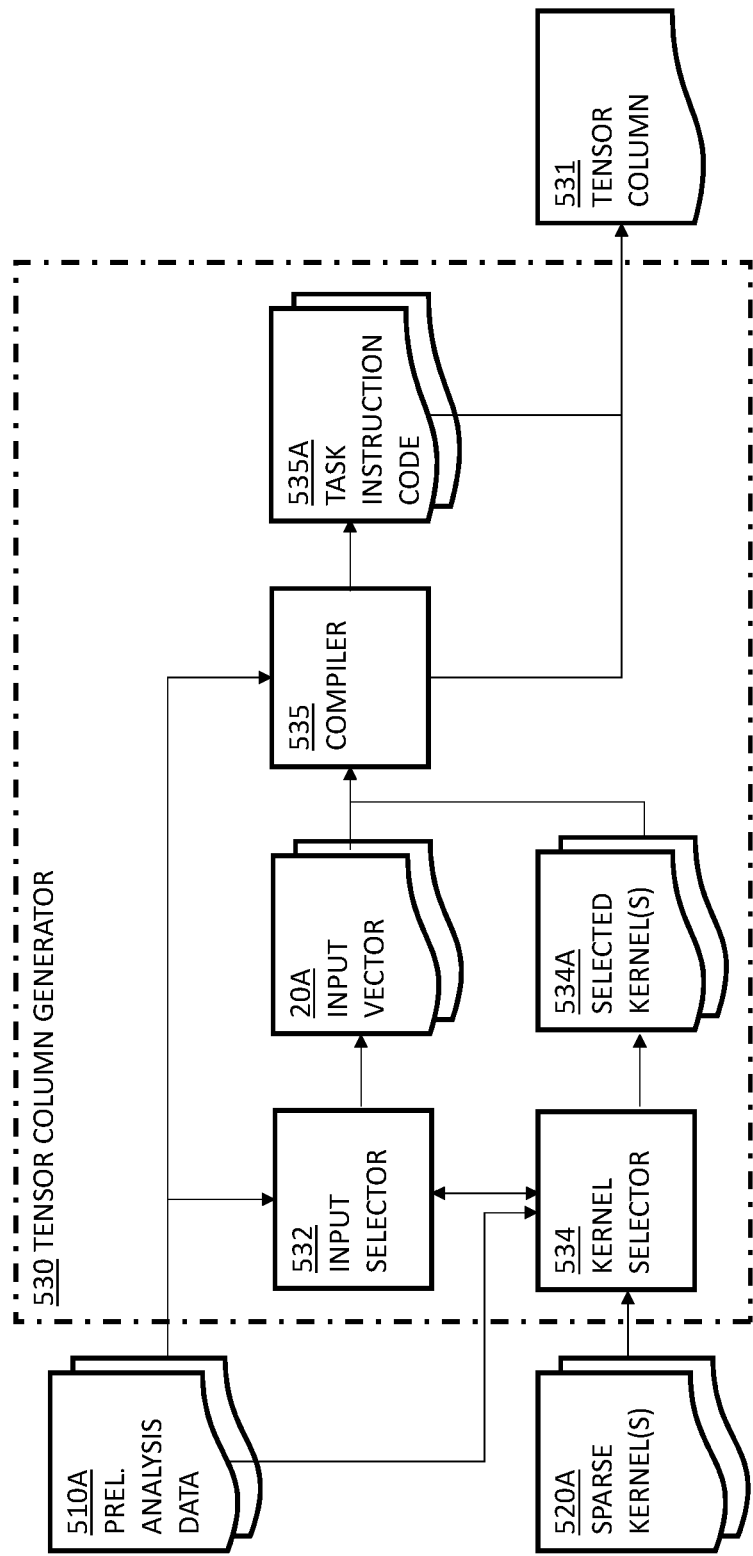
FIG. 6 is a block diagram, depicting an example of a tensor column generator that may be included in a system for executing neural networks, according to some embodiments.

Additionally, or alternatively, executing each repeated computation only once can involve compiling (e.g., by compiler module 535 of FIG. 6) the tasks 70 so to produce one or more task instruction code 535A as elaborated herein (e.g., in relation to FIG. 6). The one or more task instruction code element 535A may correspond to respective one or more task 70 and may represent computations of the respective at least one task 70. According to some embodiments, the one or more task instruction codes 535A may be computation-unique. For example: in a condition where a first task 70 and a second task 70 include an overlapping region, a first task instruction code 535A (corresponding to the first task) may include instructions for computing the outcome of the overlapping region, and a second task instruction code 535A (corresponding to the second task) may include a reference to the outcome of the overlapping region (computed by the first task).

Figure 4:
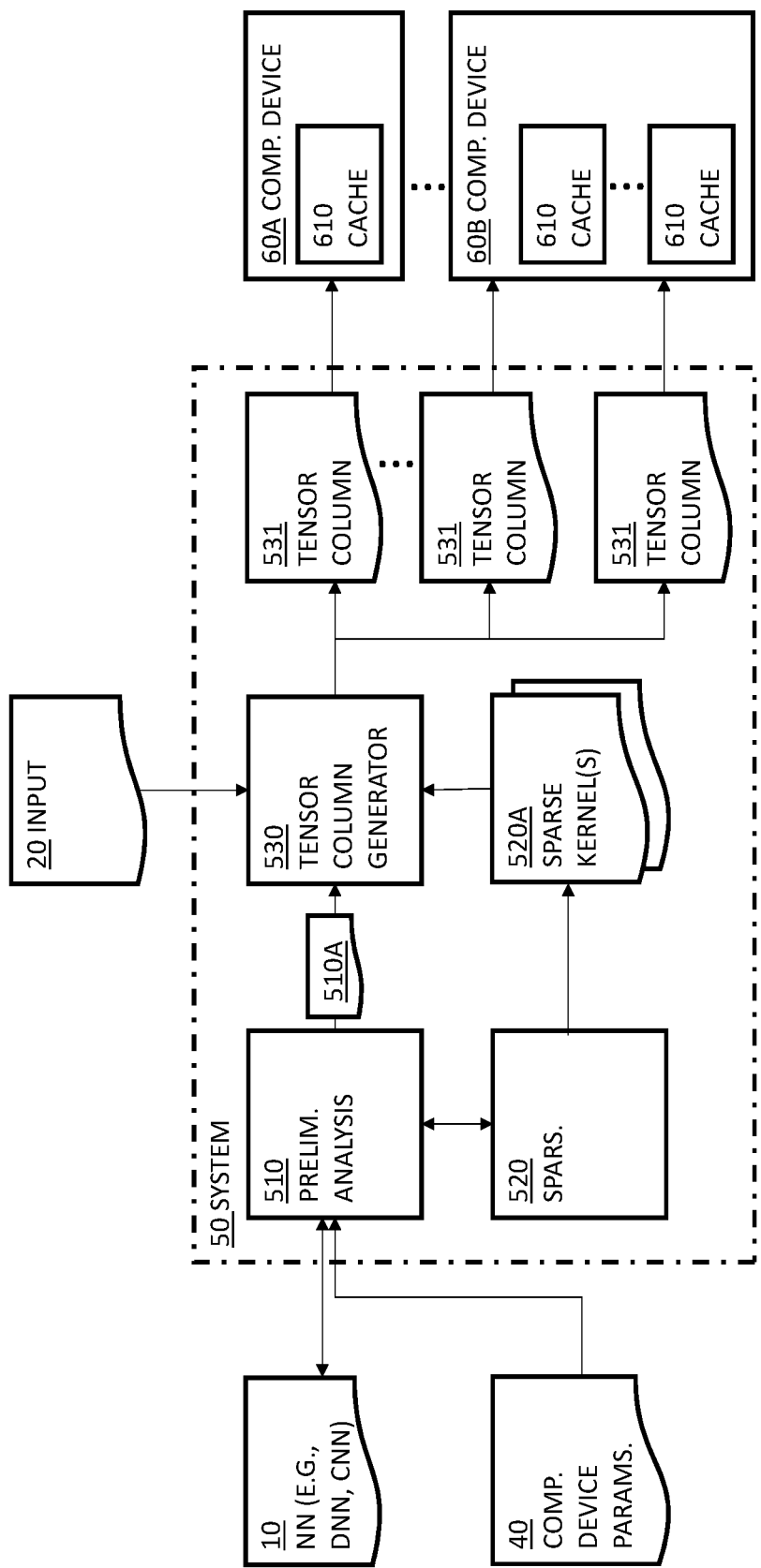
FIG. 4 is a block diagram, depicting an example of a system for executing neural networks, according to some embodiments.

Reference is now made to FIG. 4, which is a block diagram, depicting an example of a system 50 for inferring or executing a NN 10 (e.g., on incoming data 20), using one or more target computing devices 60 (e.g., 60A, 60B), according to some embodiments.

Additionally, or alternatively, system 50 may be used for training NN 10 in a back-propagation process. In such configurations, input data 20 may be or may include, for example, feedback data (e.g., supervisory data) and/or cost function values, and the NN may be trained according to the feedback data and/or cost function values, as known in the art.

According to some embodiments, system 50 may be implemented as a hardware module, as a software module, or any combination thereof. For example, system 50 may be implemented as one or more software processes and/or software threads, and may be run or executed by one or more processors, controllers or processing cores (e.g., element 2 of FIG. 1) of a computing device (e.g., element 1 of FIG. 1).

As elaborated herein (e.g., in relation to FIG. 2B) the NN may include a plurality of layers (e.g., elements 15 of FIG. 2B) and at least one layer 15 may include or be defined in part by one or more kernels (e.g., elements 12, such as 12-A1 through 12-C3 of FIG. 2B)

As shown in FIG. 4, system 50 may receive (e.g., by processor 2 of FIG. 1) a data structure that may represent or define NN 10. For example, the data structure may be or may include any appropriate structure such as tensors, a table, a graph, a linked list and the like, that may include a representations of elements pertaining to NN 10, including for example edges, weights, kernels, and layers that may be included in NN 10. The annotation of NN 10 may be used hereinafter to refer to the data structure and to elements of NN 10 that may be represented by the data structure.

According to some embodiments, system 50 may receive one or more computing device parameter values 40 pertaining to target computing devices 60 (e.g., 60A, 60B, such as element 1 of |FIG. 1). The term 'target' may refer herein to one or more computing devices which may be targeted or designated for training and/or executing (e.g., inferring) NN 10. According to some embodiments, the one or more target computing devices 60 may be or may include the same computing device as the one implementing system 50. Additionally, or alternatively, the one or more target computing devices 60 may include at least one computing device other than the computing device implementing system 50.

According to some embodiments, computing device parameter values 40 may include parameter values that pertain to cache memory of the one or more target computing devices 60. For example, computing device parameter values 40 may include: data pertaining to a cache memory of (e.g. private to, or associated with) a single processing core (e.g., an L2 cache, as known in the art) and/or data pertaining to a cache memory of (e.g. accessible by) a plurality of processing cores (e.g., an L3 cache, as known in the art). The data may pertain to, for example: a size of a data cache memory, a size of an instruction cache memory, a memory bandwidth of the cache memory (e.g., a rate at which the memory may be accessed); a utilization percentage and/or an available space of the cache memory, and the like.

According to some embodiments of the invention, as elaborated herein (e.g., in relation to FIG. 2B and FIG. 6) system 50 may analyze the data structure of NN 10 and may produce one or more tasks (e.g., elements 70 of FIG. 2B and/or FIG. 3). As shown in FIG. 2B, the produced tasks 70 may be or may include partitions of NN 10 and may include at least one computation that pertains to a kernel (e.g., elements 12, such as 12A-1 through 12C-3 of FIG. 2B) of NN 10.

According to some embodiments of the invention, system 50 may include a preliminary analysis module, configured to analyze the NN 10 data structure, and obtain one or more data elements of preliminary analysis (e.g., element 510A of FIG. 6). The preliminary analysis data may pertain to properties of NN 10 and/or the one or more target computing devices.

For example, preliminary analysis data 510A may include data pertaining to kernels of NN 10. This may include, for example: which kernels need to be used at every layer, a size of each kernel, a subset of inputs (e.g., a subset of input buffer 20 of FIG. 3) that corresponds to each kernel, a size (e.g., in data Bytes) of the corresponding subset of inputs, etc.

In another example, preliminary analysis data 510A may include data pertaining to the computation corresponding to each kernel. This may include, for example a size of a required output buffer (e.g., elements 30 of FIG. 2B), and/or an extent (e.g., a size and/or a ratio) of overlap between computations pertaining to different threads.

In another example, preliminary analysis data 510A may include data pertaining to a size of a required output buffer, in relation to one or more versions of at least one kernel 12. For example, preliminary analysis module 510 may select or receive a subset of nodes of a layer of the NN as an input vector (e.g., element 20A of FIG. 6) of a task. The nodes may, for example, be selected according to their relevance or connection to specific kernels 12 that are being analyzed. Preliminary analysis module 510 may receive (e.g., from sparsification module 520, as elaborated herein) at least one second, sparse version 520A of the kernel, characterized by a specific sparsification ratio (e.g., that have a specific percentage of kernel elements nullified). Preliminary analysis module 510 may then calculate or estimate a required memory space for output of computations of the task (e.g., in relation to each sparse kernel version 520A), in view of, or according to the input vector.

In another example, preliminary analysis data 510A may include data pertaining to assignment of tasks 70 to the one or more target computing devices 60. For example, preliminary analysis module 510 may analyze the required memory space for performing one or more tasks in view of computational device parameters 40 (e.g., available data cache, available instruction cache, memory bandwidth, etc.) of the one or more target computing devices 60) to produce a list of preferences for task 70 assignment (e.g., assigning large tasks to computing devices having a large cache memory spaces, etc.).

In another example, preliminary analysis data 510A may include at least one indication of precision, pertaining to respective at least one sparse kernel representations. In other words, preliminary analysis module 510 may perform at least one first computation pertaining to a kernel (e.g., elements 12 of FIG. 2B) in an first, dense version or form. Preliminary analysis module 510 may receive (e.g., from sparsification module 520, as elaborated herein) at least one second, sparse version 520A of the kernel, characterized by a specific sparsification ratio. Preliminary analysis module 510 may then perform at least one second computation, pertaining to the second, sparse version 520A of the kernel, and may produce an indication of precision, indicating the effect of sparsifying the kernel on the outcome of the respective computation.

According to some embodiments of the invention, system 50 may include a sparsification module 520, configured to produce one or more sparse versions 520A of one or more kernels 12 of the one or more tasks 70. For example, sparsification module 520 may receive (e.g., from preliminary analysis module 510) at least one kernel 12 of NN 10 in a first, dense version and may produce therefrom one or more (e.g., a plurality of) second, sparse versions 520A of the kernel, as elaborated above.

According to some embodiments, the one or more second, sparse versions 520A may be produced during an initial (e.g., offline) stage of system 50, e.g., before inferring NN 10 on incoming data 20, and may be stored in a storage device or system (e.g., element 6 of FIG. 1) associated with system 50.

As elaborated herein, task 70 may be or may include a data structure (e.g., a table, a linked list, etc.) that may represent a subset or partition of NN 10, including one or more nodes, weights and edges of NN 10. Additionally, task 70 may include one or more representations (e.g., matrices) of kernels 12 of NN 10. In other words, task 70 may include a representation of computations pertaining to kernels 12 of NN 10. These kernels may herein be referred to as 'original' kernels, as they may be of an initial, or 'original' version (e.g., a dense version) of kernels 12, and may be subject to modification, as elaborated herein. According to some embodiments, system 50 may include a tensor column generator module 530, configured to select at least one sparse version 520A of at least one kernel 12 (e.g., an 'original' or 'dense' kernel) of the one or more tasks 70, as elaborated herein (e.g., in relation to FIG. 6). Tensor column generator module 530 may subsequently replace the at least one kernel 12 with the selected sparse version. For example, tensor column generator 530 may move selected sparse kernel 520A data into task 70 instead of data pertaining to the original (e.g., dense) kernel 12 (e.g., in a memory space previously occupied by the original kernel 12), so as to replace the original computation (pertaining to the original, dense kernel 12) with a sparse computation (pertaining to a sparse version 520A of the kernel).

Embodiments may provide for improved NN processing that may require less storage space and processing time in relation to currently available systems and methods for inferring and/or training NNs. It may be appreciated by a person skilled in the art that replacement of an original (e.g., dense) kernel 12 by a sparse version of the kernel may require a reduced memory space on the target computing device's 60 cache, and may thus facilitate execution of task 70 computations within the cache.

For example, storage of the kernel elements themselves may be reduced to storage of the non-zero elements. Hence a size of a task instruction code block 535A that may include elements of the kernel (as operands in a computation of the kernel output) may also be reduced. In another example, the output of sparse kernel computations may also be reduced by the replacement of the original kernel 12 with a sparse version 520A.

In some embodiments, tensor column generator module 530 may select the at least one sparse version 520A and replace the respective original kernel during an initial (e.g., offline) stage of system 50 (e.g., before inferring or executing NN 10 on incoming data 20). Additionally, or alternatively, tensor column generator module 530 may select the at least one sparse version 520A during an online, or run-time stage of system 50, e.g., during execution inference of NN 10 on incoming data 20.

According to some embodiments, tensor column generator module 530 may compile the one or more tasks 70 to produce one or more respective tensor column data elements 531. The tensor column data elements 531 may include task instruction code (e.g., element 535A of FIG. 6) that may represent at least one computation of the one or more tasks 70, as elaborated herein (e.g., in relation to FIG. 6). The one or more tensor columns 531 may be produced so as to fit in respective one or more cache memories 610 of the one or more target computing devices 60, according to the received cache parameter values as elaborated herein (e.g., in relation to FIG. 6).

According to some embodiments, the one or more target computing devices 60 may be configured (e.g., explicitly, by an instruction in instruction code element 5 of FIG. 1) to store the one or more tensor columns 531 in a cache memory space (e.g., element 610 of FIG. 4) associated with the one or more target computing devices 60. Additionally, or alternatively, the one or more tensor columns 531 may be designed (e.g., by compiler element 535 of FIG. 6) so that the data therein may fit in a cache memory space 610 of the one or more target computing devices 60. The one or more target computing devices 60 may be thus configured (e.g., implicitly, by a cache policy of a processor 620 of target computing device 60) to keep the data in one or more caches.

As known in the art, systems and methods for executing (e.g., inferring) and/or training of NNs may employ computation among general-dimension matrices, commonly referred to as "tensors". Currently available systems and methods may compute the outcome of these tensors serially, one NN layer after the other, to the extent of the NN. It may be appreciated by a person skilled in the art that in the prior art such operation may be inefficient because: (a) it may require all the computations of a first layer to be concluded before the computations of subsequent layers may commence, thus disabling the possibility of parallel computing; and (b) the required memory space for such computations, including the kernel size, the input size and the output size may not (and typically is not) available on the processing core cache, limiting the computation by the processor's memory (e.g., RAM) bandwidth. Embodiments of the preset invention may provide an improvement over prior art by overcoming these deficiencies by utilizing tensor columns to enhance parallelism of NN inference and/or training.

The term "tensor column" may be used herein to indicate a tensor or a set of tensors that may be employed by embodiments of the present invention, and may include computations pertaining to a column (rather than a layer) of neural nodes of the NN, thus allowing improved parallelism in execution of the NN computations, as elaborated herein.

Figure 5:
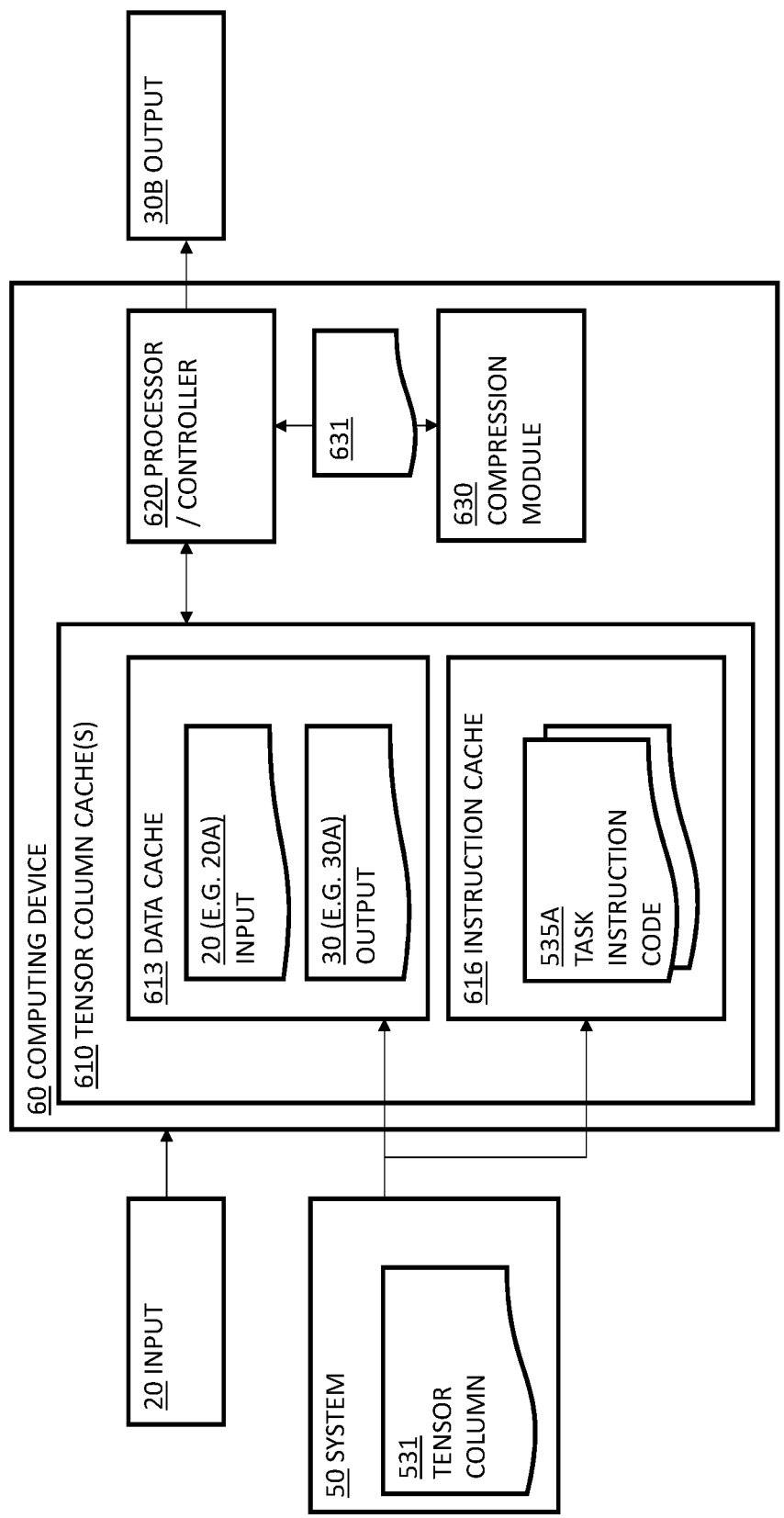
FIG. 5 is a block diagram, depicting an example of a tensor column that may be produced by a system for executing neural networks, according to some embodiments.

Reference is now made to FIG. 5, which is a block diagram, depicting an example of a tensor column that may be produced by system 50, according to some embodiments.

As elaborated herein (e.g., in relation to FIG. 6), the one or more tensor column data structures 531 may correspond to one or more specific respective tasks 70. System 50 may maintain or include in tensor column data structure 531 an input vector 20A that may include a reference to a subset of input to the respective layer.

For example, in a task that operates on an input layer of NN 10 (e.g., task 70B of FIG. 2B), input vector 20A may include a subset of incoming input data 20 and/or a reference thereto (e.g., a reference to specific entries in an input buffer that includes input 20). Additionally, or alternatively, in a task that operates on an internal layer of NN 10 (e.g., task 70D of FIG. 2B), input vector 20A may include a subset of incoming input data and/or a reference thereto (e.g., a subset of output buffer 30A of FIG. 2B). The selection of input subset 20A is elaborated herein, e.g., in relation to FIG. 6.

Additionally, as elaborated herein (e.g., in relation to FIG. 6), system 50 may maintain, or include in the one or more tensor column data structures 531 (e.g., as part of tensor column data structure 531) one or more respective task instruction code data elements (e.g., element 535A of FIG. 6). The one or more task instruction code data elements 535A may represent or implement one or more respective computation of the one or more respective tasks 70.

Additionally, system 50 may allocate in the one or more tensor column data structures 531 an output memory space (e.g., 30A), corresponding to a respective task 70. System 50 may allocate the required memory space according to the calculation of the required space, as indicated by preliminary analysis module 510, and as elaborated herein (e.g., in relation to FIG. 4).

As shown in FIG. 5, system 50 may store and/or allocate space for the one or more tensor columns in respective cache memories of the one or more target computing devices. For example, system 50 may (a) store one or more instruction code data elements 535A in an instruction cache 616 of a target computing device 60; (b) store input data (e.g., input vector 20A) or a reference thereto in a data cache 613 of the target computing device 60; and (c) allocate an output memory space (e.g., 30A) in data cache 613 of the target computing device 60.

It may be appreciated by a person skilled in the art that in embodiments where system 50 is implemented on the same computing device (e.g., element 1 of FIG. 1) as target computing device 60, storing and/or allocating space on tensor column cache 610 (e.g., on instruction cache 616 and/or data cache 613) may be implemented directly by system 50, Additionally, or alternatively, in embodiments where system 50 is implemented on a computing device other than that of target computing device 60, storing and/or allocating space on tensor column cache 610 may be performed by an appropriate command or indication from the prior to the latter.

The benefit of storage of the one or more tensor column data structures 531 and/or allocation of output memory space 30 (e.g., 30A) may be appreciated by a person skilled in the art: during run time tasks 30 of NN 10 may be executed by a processor or controller 620 (such as element 2 of FIG. 1) in the cache memory space, thus optimizing the memory bandwidth of processor 620.

Moreover, as elaborated herein (e.g., in relation to FIG. 2B), tasks 70 may include computation spanning a plurality of layers of NN 10. Hence, the respective tensor column may also include task instruction code that represents at least one computation spanning a plurality of layers of the NN. Sparsification or pruning of one or more kernels of the respective tasks 70 (as explained herein, e.g., in relation to FIG. 6) may thus facilitate the inclusion of all data required for execution of task 70, spanning across multiple layers of NN 10, within the cache memory space 610, allowing efficient execution of NN 10, as explained herein (e.g., in relation to FIG. 2B).

The execution of NN 10 may refer herein to training of NN 10 as well as to inference of NN 10 on incoming data 20.

For example, during an inference stage, system 50 may infer the neural network on incoming data 20 by executing the task instruction code 535A (e.g., from instruction cache 616) on the incoming data 20 (e.g., 20A), within the cache memory space (e.g., using the input vector 20A and the allocated output memory space 30A in data cache 613).

In another example, during a training stage, input vector 20A may include incoming training data, including one or more of: feedback data (e.g., supervised training data) and back-propagation data (e.g., cost-function data) that may be required to train NN 10, as known in the art. System 50 may train NN 10 on incoming data 20 by executing the task instruction code 535A (e.g., from instruction cache 616) on the incoming data 20 (e.g., 20A), within the cache memory space, to expediate the training process.

Reference is now made to FIG. 6, which is a block diagram, depicting an example of a tensor column generator 530 that may be included in a system 50 for executing neural networks, according to some embodiments. As shown in FIG. 6, tensor column generator 530 may receive as input at least one preliminary analysis data element 510A (e.g., from preliminary analysis module 510 of FIG. 4) and one or more sparse kernel versions 520A (e.g., from sparsification module 520 of FIG. 4). Tensor column generator 530 may produce therefrom one or more tensor columns, pertaining to a task (e.g., element 70 of FIG. 2B) of NN 10.

As shown in FIG. 6, tensor column generator 530 may include a kernel selector module 534, adapted to select one or more kernels 534A from the input one or more sparse kernel versions 520A.

For example, as elaborated herein (e.g., in relation to FIG. 4), sparse kernels 520A may include one or more sparse versions of a specific kernel 12 of a layer 15 of NN 10. One or more (e.g., each) of the sparse kernel versions 520A may be associated with a degree of sparsification or pruning (e.g., a percentage of kernel coefficients that are pruned or nullified).

It may be appreciated by a person skilled in the art that a level of pruning or sparsification applied to a kernel (e.g., the amount or percentage of pruned or nullified kernel elements or coefficients) may affect a precision of an outcome of the kernel computation. For example, as more kernel elements or coefficients are nullified, the accuracy of the kernel's output may be increasingly inaccurate or imprecise. As elaborated herein (e.g., in relation to FIG. 4), preliminary analysis module 510 may calculate a level or degree of precision of an output of a task corresponding to the one or more sparse kernel versions 520. Hence, one or more (e.g., each) of the sparse kernel versions 520A may be associated with a respective calculated degree of precision (e.g., the effect of such pruning on the calculated outcome, as elaborated herein in relation to FIG. 4).

Kernel selector 534 may receive (e.g., as part of preliminary analysis data 510A) one or more of: (a) cache parameter values, such as a cache memory threshold value (e.g., a threshold of available memory space) pertaining to a cache memory of a specific target computing device 60; (b) a required degree of precision; and (c) an estimated memory space required for calculating the output of the one or more sparse kernel versions 520A.

Kernel selector 534 may thus select a specific appropriate sparse kernel version 520A for the specific kernel 12 according to the calculated level of precision and cache parameter values. For example, kernel selector 534 may select a specific appropriate sparse kernel version 520A so as to accommodate the required degree of precision and to fit in the cache memory space of the target computing device 60, based on the cache memory threshold value and the calculated or estimated required memory space.

Alternatively, tensor column generator 530 may not employ or include kernel selector 534. In this embodiment, tensor column 531 may only include computations of original, or dense kernels 12 of NN 10, e.g., without pruning and/or selecting a sparse version 520A of the one or more kernels 12.

As known in the art, layers 15 of neural network 10 (e.g., convolutional layers) may include a varying number of kernels 12. In some embodiments, such layers 15 may require only a subset of kernels 12 to be applied to specific parts, regions or subsets of their input. Other layers may require all the kernels to be applied to each input region or subset. It may be appreciated by a person skilled in the art that the number of required kernels 12 may directly affect the selection of sparse kernel versions 520A: as the number of required kernels increases, the level of sparsification needs to increase as well, so as to accommodate the cache memory threshold requirement (e.g., fit the tensor column data structure in a cache memory 610 of a target computing device 60).

According to some embodiments, kernel selector 534 may receive (e.g., as part of preliminary analysis data 510A) an indication of the specific kernels required for processing each task (e.g., whether all kernels of a specific layers are required, whether a subset of kernels are required, etc.). Kernel selector 534 may subsequently select 534A one or more of the sparse kernel versions 520A based on the cache memory threshold value, the required degree of precision and the estimated required memory space (as elaborated above), and further based on the indication of the specific kernels (e.g., the number of kernels) required for processing the task. For example, in a condition in which the number of kernels is large, kernel selector 534 may select at least one sparse kernel version 520A having a high level of sparsification to accommodate the cache memory threshold requirement.

As shown in FIG. 6, tensor column generator 530 may include an input selector module 532. As elaborated herein, preliminary analysis module 510 may analyze the data structure of NN 10 to obtain, for example, data pertaining to structure of NN 10. This data may include, for example, edges of NN 10, that may associate at least one input data element (e.g., a node in an input layer 15 of NN 10) with one or more respective kernels 12). According to some embodiments, input selector module 532 may be adapted to: receive the data pertaining to structure of NN 10 (e.g., as part of preliminary analysis data 510A); receive (e.g., from kernel selector 534) data pertaining to at least one selected, sparse kernel version 532A; and select a subset of incoming data as an input vector 20A, based on the received data, as elaborated herein.

As explained herein, (e.g., in relation to FIG. 5), input vector 20A may include an input or a subset of an input (or reference thereto), required for computation of a specific task (e.g., elements 70 of FIG. 2B). According to some embodiments of the invention, input selector module 532 may select input vector 20A by: (a) determining a number of nodes, pertaining to a first layer 15 (e.g., an output layer, such as layer 15C of FIG. 2B) of NN 10; and (b) identifying a number of input nodes in one or more second layers (layers 15A, 15B of FIG. 2B) that precede the first layer in NN 10, the input nodes pertaining to computation of the determined group of output nodes (e.g., pertaining to one or more of kernels 12-C1, 12-C2, 12-C3 of FIG. 2B).

According to some embodiments, the nodes of the first layer may be determined iteratively. For example, input selector module 532 may start with an initial, small number of determined nodes of the first layer (e.g., 15C), and gradually increase the number of determined nodes of the first layer (e.g., 15C), as long as the required memory space for task computation is below the cache memory threshold.

According to some embodiments, the identified number of input nodes may correspond to the largest number of computations (e.g., computation of kernel outputs) that results in a memory requirement that is less than the cache memory threshold. For example, the input nodes may be selected from layers that go traverse along NN 10 as much as possible, such that the corresponding task may span over as many layers of NN 10 as possible, but still having the required memory space for task computation below the cache memory threshold.

It may be appreciated that selection of selected kernels 534A may affect input vector 20A and vice versa. For example, selection of a kernel 534A may dictate inclusion of one or more data input elements (e.g., input nodes of a layer in NN 10) in input vector 20A. In another example, overlap of a first task and a second task (e.g., the overlap of task 70A' and task 70B of FIG. 2B) may enable tensor column generator 530 to select one or more overlapped kernels (e.g., kernel 12-A2 of FIG. 2B) only in a tensor column 531 pertaining to a single task 70 of the overlapping tasks. In another example, selection of a sparse kernel version 520 may produce a condition in which at least one input data element may not significantly change an output of the computation of the respective kernel, and may thus be eliminated from input vector 20A. According to some embodiments, input selector 532 may select the input vector 20A based on the one or more selected kernels 534A. Alternatively, kernel selector 534 may select the one or more kernels 534A based on the selected input vector 20A. Additionally, or alternatively, the selection of input vector 20A and kernels 534A may be performed iteratively (e.g., over a number of iterations), until a required result is obtained. The required result may be, for example, a tensor column 531 that corresponds to a task, consuming the maximal memory space that is beneath the cache memory threshold (e.g., fits in a cache memory of a target computing device) and accommodates the precision requirement.

According to some embodiments, tensor column generator 530 may include a compiler module 535, adapted to compile one or more tasks 70 to produce one or more respective tensor columns 531.

As elaborated herein (e.g., in relation to FIG. 2B), task 70 may be, or may include a data structure that may represent a group of computations (e.g., computations of one or more kernels 12) of NN 10. For example, the one or more tasks 70 may be or may include subsets of the NN 10 data structure, including one or more representations of neural nodes, spanning over one or more layers 15 of NN 10.

As elaborated herein (e.g., in relation to FIG. 5), the one or more tensor columns 531 may include a reference to an input vector (e.g., 20A) of a task 70, an allocation of at least one output memory space (e.g., 30A) of the task 70 and an element of task instruction code 535A that may represent at least one computation of the respective task 70 (e.g., at least one computation pertaining to a kernel of task 70).

As elaborated herein, compiler module 535 may be configured to produce at least one task instruction code block 535A such that task instruction code block 535A may be compact, e.g., in terms of instruction cache memory 616 space consumption.

For example, compiler 535 may receive (e.g., as part of preliminary analysis data 510) data pertaining to specific target computing device 60 (e.g., data pertaining to structure and/or an available instruction set of device 60) and may produce a compact task instruction code block 535A that optimally employs the data pertaining to device 60. For example, compiler module 535 may produce task instruction code 535A that may employ vector operations, such as multiply-accumulate operations or vector fused multiply-add (FMA), that may be specifically adapted to the architecture of target computing device 60, as known in the art.

Additionally, or alternatively, compiler module 535 may produce the at least one task instruction code block 535A such that the task instruction code 535A may consume a minimal number of computing cycles.

For example, as known in the art, previously available systems for inferring NNs may compute the outcome of sparse kernels by applying the entire kernel, including the zero-value coefficients on the input. This operation is sub-optimal, as it may not exploit the sparse nature of the kernel. Other currently available systems for inferring NNs may compute the outcome of sparse kernels by 'forking' the execution of the kernel computation according to the value of the kernel coefficients (e.g., "perform the computation if the coefficient is non-zero, and avoid the computation otherwise"). This operation is also sub-optimal, as the fork operation may be time-wise expensive, especially in multiple core computing environments such as GPUs. In contrast, as elaborated herein, embodiments of the invention may improve processing by, for example, compiling the one or more tasks 70 to produce a task instruction code block 535A that is devoid (e.g. has none) of zero-value kernel elements. In other words, task instruction code block 535A may not include computations that involve zero-value kernel coefficients or instructions for forking the computation according to the value of kernel coefficients.

According to some embodiments, producing a task instruction code block that is devoid of zero-value kernel elements may include compressing a kernel (e.g., a sparse kernel version 520A) to include or represent only non-zero elements of the kernel.

For example, during compilation of the one or more tasks 70, compiler 535 may perform a compressed sparse row (CSR) compression on a kernel (e.g., a sparse kernel version 520A) to produce a compressed CSR format of the kernel, as known in the art.

Compiler 535 may subsequently include the kernel in the compressed format (e.g., the CSR format of sparse kernel version 520A) in task instruction code 535A. During inference of NN 10 (e.g., during execution of task instruction code 535A by target computing device 60), a processor (e.g., 620 of FIG. 5) may decompress the compressed format (e.g., the CSR format) to obtain non-zero elements of the kernel (e.g., non-zero elements of sparse kernel version 520A). Processor 620 may then perform kernel-related computations of task 70 that only pertain to the non-zero kernel elements. In other words, processor 620 may traverse over the non-zero elements of the kernel and perform respective computations without wasting time on zero-valued kernel elements.

In another example, producing a task instruction code block or segment that is devoid of zero-value kernel elements may include "hard coding" the values of non-zero kernel elements in task instruction code 535A. In other words, compiler 535 may take into the task instruction code 535A only values of non-zero elements, rather than these elements' location within the kernel.

During compilation of the one or more tasks 70, compiler 535 may include only non-zero elements of at least one kernel (e.g., a sparse kernel version 520A) in task instruction code 535A. Thus, task instruction code block 535A may include computations (e.g., vector FMA computations) that are "hard coded" to include only non-zero kernel elements or coefficients. During inference of NN 10 (e.g., during execution of task instruction code 535A by target computing device 60), processor 620 may perform kernel-related computations that only pertain to the non-zero kernel elements. In other words, processor 620 may avoid computing and/or forking on computations that include zero-value kernel elements.

According to some embodiments, the structure of tensor column data structure 531 may facilitate multiple computations of kernel outputs, spanning over a plurality of layers of NN 10, during a stage of inference.

For example, referring back to FIG. 2B, NN 10 may be a neural network adapted or trained to perform a task such as an image processing task (e.g., an object recognition task). During an inference stage of NN 10, a target computing device system 50 may receive an incoming data element 20 (e.g., an object to be recognized).

For each task (e.g., elements 70 of FIG. 2B), including a plurality of kernel computations (e.g., computation of kernel elements 12), system 50 may obtain a data subset of incoming data according to each respective input vector 20A. For example, as depicted in FIG. 2B, a first task 70 (e.g., task 70A') may receive as input a subset of a first layer (e.g., input layer 15A). The first task may therefore be associated with a first input vector 20A that may include references or pointers to a respective subsets of the first layer (e.g., input layer 15A). System may use the references or pointers of input vector 20A to obtain the respective data subset (e.g., the respective portion of the input image).

In another example, a second task 70 (e.g., task 70D) may receive as input a subset of a second layer (e.g., layer 15B). The second task may therefore be associated with a second input vector 20A that may include references or pointers to a respective subsets of inputs to the second layer (e.g., a subset of output buffer 30A).

For each task 70, system 50 may produce a respective tensor column 531, including a task instruction code block 535A and a respective input vector (e.g., element 20A of FIG. 5). In embodiments where system 50 is implemented on a separate computing device than that of target computing device 60, system 50 may transfer the tensor column 531 to target computing device 60 for execution.

A processor (e.g., element 620 of FIG. 5) of target computing device 60 may perform the computation represented by the respective task instruction code block 535A on the obtained data subset (e.g., input vector 20A), within the target computing device's cache memory (e.g., tensor column cache element 610 of FIG. 5), starting with the first layer in the task.

For example, for task 70B of FIG. 2B, target computing device 60 may perform a computation of output of kernels 12-A2 and 12-A3, by applying task instruction code block 535A (stored in instruction cache 616 of FIG. 5) on the obtained data input (e.g., a subset of input layer 15A). Target computing device 60 may then store the computation output in the allocated output memory space (e.g., on data cache 613 of FIG. 5).

Target computing device 60 may repeat the computation and storing steps elaborated above with computations pertaining to subsequent layers (e.g., 15B, 15C, etc.) of NN 10, using the data stored in the allocated output memory space as input for the subsequent computation. This may be done to the extent of the task instruction code, thus performing all the computations pertaining to a task within a cache memory space 610 of the target computing device 60.

It may be appreciated by a person skilled in the art that performing all the computations pertaining to a task (e.g., spanning across a plurality of layer 15) within a cache memory of the target device 60 may provide an improvement over previously available systems for execution (e.g., inference and/or training) of NNs. Previously available systems typically execute entire layers of the NN sequentially, e.g., one layer after the other. Therefore, previously available systems are required to store and retrieve the outcome of each layer 15 in a memory module that includes a large memory space, such as an external memory or storage module or device (e.g., elements 4 and 6 of FIG. 1). As known in the art, such external memory modules are characterized by memory bandwidth that is significantly lower than that of internal (e.g., cache) memory modules. Thus, execution (e.g., inference and/or training) of NNs, as implemented (e.g., including access to external memory) by previously available systems may incur latency that much exceeds that of embodiments of the present invention.

According to some embodiments of the invention, processor 620 may store the computation output in a compressed mode. For example, computing device may include a compression module 630, adapted to produce a compressed version 631 of the computed output. The compressed version 631 may include only elements of the computation output that have non-zero values (e.g., non-zero elements). Processor 620 of computing device 60 may then store the compressed version 631 in the allocated output memory space, to be used for subsequent layer computations of the task 70. It may be appreciated that embodiments may thus provide for improved NN processing in relation to currently available systems and methods for inferring and/or training NNs: compression of the computation output may result in a reduced or more efficient use or consumption of cache memory space. The reduced consumption of cache memory space may, in turn, expand a scope of the computed task 70 (e.g., to include additional computations from the same layers of the task and/or from additional layers), and facilitate an improved level of parallelism to the inference and/or training of the NN.

Figure 7:
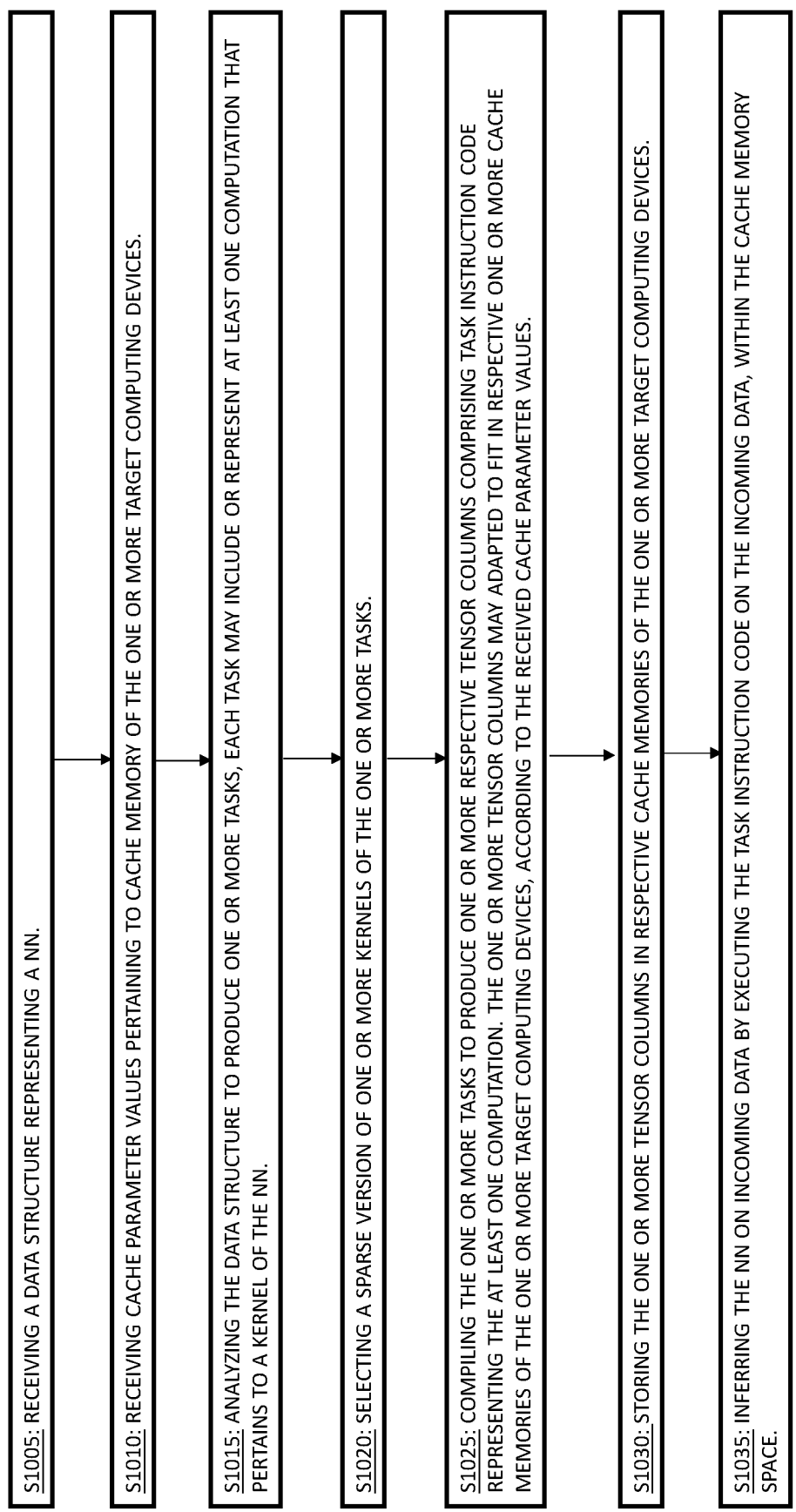
FIG. 7 is a flow diagram, depicting an example of a method of executing neural networks, according to some embodiments.

Reference is now made to FIG. 7, which is a flow diagram, depicting an example of a method of executing (e.g., inferring and/or training) neural networks, according to some embodiments.

As shown in step S1005, and as elaborated herein (e.g., in relation to FIG. 4), embodiments may include receiving, by a processor (e.g., element 2 of FIG. 1) of system 50, a data structure (e.g., element 10 of FIG. 4) that may represent the NN. Data structure 10 may include, for example, one or more interconnected layers of neurons of the NN, including for example, a convolutional layer, a fully connected NN layer and the like.

As shown in step S1010, embodiments of the invention may include receiving (e.g., by processor 2) computing device parameters (e.g., element 40 of FIG. 4) pertaining to one or more computing devices 60 (e.g., elements 60A, 60B of FIG. 4); such computing devices may be termed target architectures, or devices corresponding to target architectures. Computing device parameters 40 may include, for example, cache parameter values (e.g., cache size, available cache memory on one or more cache layers, cache memory bandwidth, etc.) pertaining to cache memory of the one or more target computing devices 60. Additionally, or alternatively, computing device parameters 40 may include data pertaining to a workload of one or more (e.g., each) computing device 60, a structure (e.g., a number of processing cores) of one or more (e.g., each) computing device 60 and a processing throughput or speed of each processing core.

As shown in step S1015, embodiments of the invention may include analyzing (e.g., by processor 2) NN data structure 10 to produce one or more tasks (e.g., elements 70 of FIG. 2B). As elaborated herein, each task may include or represent a subset of the computations of NN 10. For example, task 70 may be or may include a data structure that is a subset of NN data structure 10 and may include or represent at least one computation that pertains to a kernel of NN 10.

As shown in step S1020, and elaborated herein (e.g., in relation to FIG. 6) embodiments of the invention may include selecting (e.g., by kernel selector module 534 of FIG. 6) a sparse version (e.g., element 520A of FIG. 6) of one or more kernels (e.g., elements 12, such as 12-A1 through 12-C3 of FIG.) of the one or more tasks 70. As elaborated herein (e.g., in relation to FIG. 6) sparse version 520A may be selected so as to avoid a change in NN 10 output that is beyond a predefined precision threshold.

As shown in step S1025, and elaborated herein (e.g., in relation to FIG. 6) embodiments of the invention may include compiling (e.g., by compiler module 535 of FIG. 6) the one or more tasks 70, to produce one or more respective tensor column data elements 531. As shown in FIG. 5, the one or more tensor column data elements 531 may include task instruction code 535A representing the at least one computation of task 70, a reference to one or more input vectors 20A of the task 70 and an allocation of output memory space, required to perform a computation of the task 70. As elaborated herein (e.g., in relation to FIG. 6) compiler module 535 may adapt the one or more tensor column data elements 531 to fit in respective one or more cache memories (e.g., elements 610) of the one or more target computing devices 60, according to the received cache parameter values (e.g., according to the cache memory size) of computing device parameters 40.

As shown in step 1030, and elaborated herein (e.g., in relation to FIG. 5), embodiments of the invention may store the one or more tensor column data elements 531 in respective cache memories 610 of the one or more target computing devices 60.

As shown in step S1035, the one or more target computing devices 60 may infer the NN on incoming data by executing the task instruction code 535A on the incoming data, within the cache memory space.

As explained herein, (e.g., in relation to FIG. 2B), embodiments of the invention may divide or partition NN 10 to one or more tasks 70, each representing a portion or subset of NN 10. Embodiments of the invention may perform, in parallel, computations pertaining to the one or more tasks (e.g., on predefined, respective one or more target devices 60), and may subsequently accumulate the output of computations pertaining to the one or more tasks 70, to produce an overall, integrated execution (e.g., inference) of the NN.

It may be appreciated that embodiments of the invention provide an improvement of parallelism in computation over prior art: For example, a task instruction code block 535A may be executed so that computation for a portion of a first layer may be completed before the entirety of the computation of a second layer is completed, even if the first layer may take input from the second layer.

Embodiments of the invention may include a practical application for executing (e.g., inferring) and/or training a neural network by one or more processing cores of target computing devices 60.

As elaborated herein, execution of the NN 10 by embodiments of the invention may produce a synergy between two processes: A first process may include pruning or sparsification (or selection of sparse versions) of kernels 12 of the NN, and a second process may include dividing or partitioning the computations of NN 10 to a plurality of tasks 70, where each task 70 spans over one or more layers 15 of NN 10. Based on this synergy, execution of the neural network by embodiments of the invention may be performed in a manner that may optimally exploit the processing speed or throughput of the target processing cores and may thus be more efficient than currently available systems:

For example, as explained herein, kernels 12 may be pruned or made sparse 520A, so as to fit the computation pertaining to tasks 70 within cache memory space 610. Furthermore, during execution of computations of a task, a pre-allocated memory space within the cache (e.g., output buffer 30A of FIG. 5) may be reused by processor 620 of the target computing device as output storage of a computation of a first layer 15 (e.g., 15A) of a task 70 and as an input for a computation of a subsequent layer 15 (e.g., 15B) of the task 70. Therefore, the synergy between the sparsification or pruning process and the task-partition process may enable embodiments of the invention to perform computations pertaining to multiple-layer tasks 70 within a cache memory space 610 of each respecting computing device's 60 processing core. Target computing devices 60 may thus avoid accessing slower, external memory modules (e.g., RAM memory) for storing and retrieving computation results.

In another example, the synergy between the sparsification or pruning process and the task-partition process may facilitate concurrent execution of computations pertaining to a plurality of tasks 70 on a plurality of processing cores of target computing devices, while taking into account each processing core's characteristics (e.g., cache memory size) and/or workload.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of inferring a neural network (NN) on one or more target computing devices by at least one processor, the NN comprising a plurality of layers, the method comprising:
   receiving cache parameter values pertaining to cache memory of the one or more target computing devices; and
   producing one or more tensor columns each comprising task instruction code representing at least one computation pertaining to a sparse version of a kernel of the NN,
   wherein the one or more tensor columns are adapted to fit in respective one or more cache memories of the one or more target computing devices, according to the received cache parameter values; and
   wherein at least one tensor column comprises task instruction code that represents at least one computation spanning a plurality of layers of the NN.

2. The method of claim 1, comprising:
   storing the one or more tensor columns in respective cache memories of the one or more target computing devices; and
   inferring the NN on incoming data by executing the task instruction code on the incoming data, within the cache memory.

3. The method of claim 1, comprising:
   selecting a sparse version of one or more kernels, wherein the selecting comprises:
      producing one or more sparse versions of the of one or more kernels;
      calculating a level of precision of an output of a task corresponding to the one or more sparse versions; and
      selecting a sparse version from the one or more sparse versions according to at least one of: the calculated level of precision and the cache parameter values.

4. The method of claim 1, comprising compiling the task instruction code to produce a task instruction code block that is devoid of zero-value kernel elements.

5. The method of claim 4, wherein producing a task instruction code block that is devoid of zero-value kernel elements comprises including a compressed format of at least one sparse kernel version in the task instruction code, and wherein the method comprises, during inference of the NN, decompressing the compressed format to obtain non-zero elements of the sparse kernel and performing kernel-related computations that only pertain to the non-zero kernel elements.

6. The method of claim 4, wherein producing a task instruction code block that is devoid of zero-value kernel elements comprises including only non-zero elements of at least one sparse kernel version in the task instruction code, and wherein the method comprises, during inference of the NN, performing kernel-related computations that only pertain to the non-zero kernel elements.

7. The method of claim 1, comprising for a tensor column:
selecting a subset of nodes of a layer of the NN as an input vector of the task instruction code of the tensor column; and
calculating a required memory space for output of computations of the task instruction code for the tensor column, according to the input vector.

8. The method of claim 7, comprising:
maintaining the input vector as part of the respective tensor column data structure; and
allocating the required output memory space in the respective tensor column data structure.

9. The method of claim 8, comprising:
storing the task instruction code on an instruction cache memory of a target computing device;
storing the input vector on a data cache memory of the target computing device; and
allocating the required output memory space on a data cache memory of the target computing device.

10. The method of claim 8, comprising:
a. receiving an incoming data element;
b. obtaining a data subset of the incoming data element according to the input vector;
c. applying a computation represented by the task instruction code on the obtained data subset, the computation pertaining to a first layer of the NN;
d. storing the computation output in the allocated output memory space; and
e. repeating operations c and d with computations pertaining to subsequent layers of the NN, using the data stored in the allocated output memory space as input to the extent of the task instruction code.

11. The method of claim 10, wherein storing the computation output comprises compressing the computation output to produce a compressed output version comprising only non-zero elements of the computation output and storing the compressed version in the allocated output memory space.

12. The method of claim 7, wherein the cache parameter values comprise a cache memory threshold and wherein selecting a subset of nodes comprises:
determining a group of output nodes pertaining to a first layer of the plurality of layers; and
identifying a number of input nodes in one or more second layers that precede the first layer in the NN, the input nodes pertaining to computation of the determined group of output nodes,
wherein the number of input nodes corresponds to the largest number of computations that results in a memory requirement that is less than the cache memory threshold.

13. A method of training a NN on one or more target computing devices, the NN comprising a plurality of layers, the method comprising:
receiving cache parameter values pertaining to cache memory of the one or more target computing devices;
producing one or more respective tensor columns each comprising task instruction code representing at least one computation pertaining to a sparse version of a kernel of the NN, wherein at least one tensor column comprises task instruction code that represents at least one computation spanning a plurality of layers of the NN;
storing the one or more tensor columns in respective cache memories of the one or more target computing devices according to the received cache parameter values; and
training the NN on incoming training data by executing the task instruction code on the incoming data, within the cache memory.

14. The method of claim 13, comprising:
storing the one or more tensor columns in respective cache memories of the one or more target computing devices; and
training the NN on incoming data by executing the task instruction code on the incoming data, within the cache memory.

15. A system for inferring a NN on one or more target computing devices, the system comprising: a non-transitory memory device, wherein instruction code is stored, and a processor associated with the memory device, and configured to execute the instruction code, whereupon execution of the instruction code, the processor is configured to:
receive cache parameter values pertaining to cache memory of the one or more target computing devices; and
produce one or more tensor columns each comprising task instruction code representing at least one computation pertaining to a sparse version of a kernel of the NN,
wherein the one or more tensor columns are adapted to fit in respective one or more cache memories of the one or more target computing devices, according to the received cache parameter values; and
wherein at least one tensor column comprises task instruction code that represents at least one computation spanning a plurality of layers of the NN.

16. The system of claim 15, whereupon execution of the instruction code, the processor is configured to:
store the one or more tensor columns in respective cache memories of the one or more target computing devices; and
infer the NN on incoming data by executing the task instruction code on the incoming data, within the cache memory.

17. The system of claim 15, whereupon execution of the instruction code, the processor is configured to:
select a sparse version of one or more kernels, wherein the selecting comprises:
producing one or more sparse versions of the of one or more kernels;
calculating a level of precision of an output of a task corresponding to the one or more sparse versions; and
selecting a sparse version from the one or more sparse versions according to at least one of: the calculated level of precision and cache parameter values.

18. The system of claim 15, whereupon execution of the instruction code, the processor is configured to compile the task instruction code to produce a task instruction code block that is devoid of zero-value kernel elements.

19. The system of claim 15, whereupon execution of the instruction code, the processor is configured to, for a tensor column:
select a subset of nodes of a layer of the NN as an input vector of the task instruction code of the tensor column; and
calculate a required memory space for output of computations of the task instruction code for the tensor column, according to the input vector.

20. The system of claim 19, wherein the cache parameter values comprise a cache memory threshold and wherein selecting a subset of nodes comprises:
- determining a group of output nodes pertaining to a first layer of the plurality of layers; and
- identifying a number of input nodes in one or more second layers that precede the first layer in the NN, the input nodes pertaining to computation of the determined group of output nodes, wherein the number of input nodes corresponds to the largest number of computations that results in a memory requirement that is less than the cache memory threshold.

* * * * *